United States Patent
Yuan et al.

(10) Patent No.: US 11,277,841 B2
(45) Date of Patent: Mar. 15, 2022

(54) BEAM DETERMINING METHOD, FIRST COMMUNICATIONS DEVICE, AND SECOND COMMUNICATIONS DEVICE

(71) Applicant: HUAWEI TECHNOLOGIES CO., LTD., Guangdong (CN)

(72) Inventors: Pu Yuan, Shenzhen (CN); Jun Luo, Kista (SE); Zhengzheng Xiang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/989,297

(22) Filed: Aug. 10, 2020

(65) Prior Publication Data

US 2020/0383098 A1     Dec. 3, 2020

Related U.S. Application Data

(63) Continuation of application No. PCT/CN2019/071612, filed on Jan. 14, 2019.

(30) Foreign Application Priority Data

Feb. 11, 2018 (CN) .......................... 201810140679.2

(51) Int. Cl.
H04W 72/04 (2009.01)
H04W 4/40 (2018.01)
(Continued)

(52) U.S. Cl.
CPC .......... *H04W 72/046* (2013.01); *H04B 7/061* (2013.01); *H04W 4/40* (2018.02); *H04W 56/001* (2013.01)

(58) Field of Classification Search
CPC ... H04W 72/046; H04W 4/40; H04W 56/001; H04W 4/46; H04W 4/44; H04W 72/04;
(Continued)

(56) References Cited

U.S. PATENT DOCUMENTS 9,893,846 B2 *   2/2018  Yu ........................ H04B 7/0695
2007/0165736 A1 * 7/2007  Wang ................... H04B 7/0695
                                                              375/267
(Continued)

FOREIGN PATENT DOCUMENTS

CN       105637952 A       6/2016
CN       106358216 A       1/2017
(Continued)

OTHER PUBLICATIONS

Huawei et al.,"Further details on beam indication",3GPP TSG RAN WG1 Meeting#91 R1-1719806, Nov. 27-Dec. 1, 2017,total 12 pages.

*Primary Examiner* — Afshawn M Towfighi
(74) *Attorney, Agent, or Firm* — Womble Bond Dickinson (US) LLP

(57) ABSTRACT

In one embodiment, a method includes: sending, by a first communications device, B synchronization signal blocks to a second communications device by using A transmit beams, where each of the B synchronization signal blocks includes an identifier of the first communications device and receive beam time sequence information of the first communications device, and wherein the receive beam time sequence information indicates a time sequence location at which the first communications device receives feedback information; receiving first feedback information from the second communications device based on the time sequence location by using C receive beams; determining a first receive beam based on a receive beam that is in the C receive beams and on which the first feedback information is received; and determining a first transmit beam based on the first receive beam or the first feedback information, where the first transmit beam belongs to the A transmit beams.

19 Claims, 10 Drawing Sheets

(51) Int. Cl.
*H04B 7/06* (2006.01)
*H04W 56/00* (2009.01)

(58) Field of Classification Search
CPC ..... H04W 56/00; H04B 7/061; H04B 7/0695; H04B 7/088; H04B 7/0639; H04B 7/0608; H04B 7/0617; H04B 7/0619; H04L 1/16; H04L 5/00; H04L 1/1607; H04L 5/0005; H04L 5/0048; H04L 5/0055
See application file for complete search history.

(56) References Cited

U.S. PATENT DOCUMENTS

| | | | |
|---|---|---|---|
| 2010/0190450 A1* | 7/2010 | Stirling-Gallacher | ........................ H04B 7/0695 455/67.13 |
| 2013/0182683 A1 | 7/2013 | Seol et al. | |
| 2018/0145415 A1* | 5/2018 | Henry | .................... H01Q 13/06 |
| 2019/0260461 A1* | 8/2019 | Kim | .................... H04W 72/085 |
| 2019/0349960 A1* | 11/2019 | Li | ........................ H04W 72/1242 |
| 2020/0177249 A1* | 6/2020 | Ramireddy | .......... H04B 7/0469 |
| 2020/0204325 A1* | 6/2020 | Liu | ........................ H04W 24/10 |

FOREIGN PATENT DOCUMENTS

| | | | |
|---|---|---|---|
| CN | 106900075 A | | 6/2017 |
| CN | 107645322 A | | 1/2018 |
| WO | 2015070679 A1 | | 5/2015 |
| WO | 2016163542 A1 | | 10/2016 |
| WO | 2017044155 A1 | | 3/2017 |

\* cited by examiner

BEAM DETERMINING METHOD, FIRST COMMUNICATIONS DEVICE, AND SECOND COMMUNICATIONS DEVICE

CROSS-REFERENCE TO RELATED APPLICATIONS

This application is a continuation of International Application No. PCT/CN2019/071612, filed on Jan. 14, 2019, which claims priority to Chinese Patent Application No. 201810140679.2, filed on Feb. 11, 2018. The disclosures of the aforementioned applications are herein incorporated by reference in their entireties.

TECHNICAL FIELD

This application relates to the field of communications technologies, and in particular, to a beam determining method, a first communications device, and a second communications device.

BACKGROUND

A vehicle-to-everything (V2X) communications system includes a vehicle-to-vehicle (V2V) intelligent transportation service, a vehicle-to-pedestrian (V2P) intelligent transportation service, a vehicle-to-infrastructure (V2I) intelligent transportation service, a vehicle-to-network (V2N) intelligent transportation service, and the like. The V2V intelligent transportation service is used as an example. In actual application, vehicles may directly communicate with each other. To be specific, communication between the vehicles does not need to rely on a base station, and signal strength of a received signal can be improved and a bit error rate can be reduced through beam alignment. In an existing solution, to implement beam alignment between vehicles, signal synchronization needs to be first completed between the vehicles, and then a base station sends a downlink reference signal to perform beam training. In this way, beam alignment between the vehicles is implemented after the signal synchronization is completed, and the reference signal occupies additional time-frequency resources.

In this scenario, how to implement beam alignment between two communications devices earlier and reduce a waste of time-frequency resources is a problem that needs to be resolved.

SUMMARY

This application provides a beam determining method, a first communications device, and a second communications device, so that beam alignment between a first communications device and a second communications device can be completed earlier, and no additional reference signal is required to implement beam alignment, so as to reduce a waste of time-frequency resources.

According to a first aspect, an embodiment of this application provides a beam determining method, including:

sending, by a first communications device, B synchronization signal blocks to a second communications device by using A transmit beams, where each of the B synchronization signal blocks includes an identifier of the first communications device and receive beam time sequence information of the first communications device, and the receive beam time sequence information is used to indicate a time sequence location at which the first communications device receives feedback information; receiving, by the first communications device, first feedback information from the second communications device based on the time sequence location by using C receive beams, and determining a first receive beam based on a receive beam that is in the C receive beams and on which the first feedback information is received; and determining a first transmit beam based on the first receive beam or the first feedback information, where the first transmit beam belongs to the A transmit beams.

The first communications device may send first information to the second communications device by using the first transmit beam, and may receive second information from the second communications device by using the first receive beam.

In the first aspect, the first communications device may determine, in a synchronization phase, the first receive beam and the first transmit beam that are used to perform information transmission with the second communications device, so that the first receive beam and the first transmit beam are determined earlier, and no additional reference signal is required to implement beam alignment, so as to reduce a waste of time-frequency resources.

In one embodiment, the receive beam time sequence information indicates at least one time sequence location, an $i^{th}$ time sequence location corresponds to a receiving direction of a $j^{th}$ receive beam, the $i^{th}$ time sequence location belongs to the at least one time sequence location, and the $j^{th}$ receive beam belongs to the C receive beams. It may be understood that the time sequence location in the receive beam time sequence information is a location in a time window, the time window may include all time sequence locations indicated by the receive beam time sequence location information, and both i and j are positive integers. In a correspondence, one time sequence location uniquely corresponds to a receiving direction of one receive beam, and a receiving direction of one receive beam uniquely corresponds to one time sequence location. In another correspondence, one time sequence location uniquely corresponds to a receiving direction of one receive beam, and a receiving direction of one receive beam may correspond to one or more time sequence locations. This is not limited in this embodiment of this application.

Based on this design, in the aspect of receiving the first feedback information from the second communications device based on the time sequence location by using the C receive beams, the first communications device specifically performs the following operation: receiving the first feedback information from the second communications device at the $i^{th}$ time sequence location by using the $j^{th}$ receive beam corresponding to the $i^{th}$ time sequence location.

In one embodiment, when the first feedback information is received on a plurality of receive beams, the first receive beam is a receive beam that is in the plurality of receive beams and that has highest received signal strength, where the plurality of beams belong to the C receive beams. In this way, the first communications device more accurately receives information about the second communications device by using the first receive beam.

In one embodiment, in a scenario in which the first transmit beam needs to be determined based on an identifier of the synchronization signal block, A is a positive integer less than or equal to B. An $s^{th}$ transmit beam in the A transmit beams corresponds to an identifier of at least one of the B synchronization signal blocks.

Specifically, one or more synchronization signal blocks may be sent on one transmit beam, and one synchronization signal block can be sent on only one transmit beam. In this way, the first communications device can uniquely determine one first transmit beam based on an identifier of one synchronization signal block, and both k and s are positive integers.

In one embodiment, a $k^{th}$ synchronization signal block in the B synchronization signal blocks further includes an identifier of the $k^{th}$ synchronization signal block; the first feedback information further includes an identifier of a synchronization signal block received by the second communications device, and the $s^{th}$ transmit beam in the A transmit beams corresponds to the identifier of the at least one of the B synchronization signal blocks; and the first transmit beam is determined based on the identifier of the synchronization signal block that is included in the first feedback information. One synchronization signal block corresponds to an identifier of the synchronization signal block, and identifiers of different synchronization signal blocks are different. The identifier of the synchronization signal block may alternatively be described by using a time index of the synchronization signal block. This is not limited in this embodiment of this application.

In one embodiment, the first feedback information further includes an identifier of the first feedback information; and the method further includes: sending, by the first communications device, second feedback information to the second communications device by using the first transmit beam, where the second feedback information includes the identifier of the first feedback information received by the first communications device by using the first receive beam, so that the second communications device determines the second transmit beam based on the second feedback information.

In one embodiment, the receive beam time sequence information is further used to indicate a receiving direction of at least one receive beam of the first communications device, and the at least one receive beam belongs to the C receive beams.

The $i^{th}$ time sequence location corresponds to the receiving direction of the $j^{th}$ receive beam, the $i^{th}$ time sequence location belongs to the at least one time sequence location, the $j^{th}$ receive beam belongs to the C receive beams, and both i and j are positive integers. For example, in specific implementation, the first communications device may indicate, by using the receive beam time sequence information, the at least one time sequence location and a receiving direction that is of a receive beam and that corresponds to each of the at least one time sequence location.

In one embodiment, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH. The indication herein may include an explicit indication or an implicit indication. The indicated information may be directly indicated through the explicit indication, and when the implicit indication is used, a quantity of occupied bits may be reduced, and security of the indicated information may be improved.

In one embodiment, the first information may be data, control information, HARQ feedback information, a reference signal, a training sequence, or other information received by the second communications device from the first communications device. The second information may be data, control information, HARQ feedback information, a reference signal, a training sequence, or other information sent by the second communications device to the first communications device. The first information and the second information are not limited in this embodiment of this application.

In one embodiment, the first feedback information includes an identifier of the second communications device, so that the first communications device determines a device from which the first feedback information comes.

According to a second aspect, an embodiment of this application provides a beam determining method, including:

receiving, by a second communications device, a synchronization signal block from a first communications device by using D receive beams, where the synchronization signal block includes an identifier of the first communications device and receive beam time sequence information of the first communications device, and the receive beam time sequence information is used to indicate a time sequence location at which the first communications device receives feedback information; determining, by the second communications device, a second receive beam based on a receive beam that is in the D receive beams and on which the synchronization signal block is received, and determining a second transmit beam based on the second receive beam; and then sending, by the second communications device, first feedback information to the first communications device based on the receive beam time sequence information by using the second transmit beam. The second communications device may receive first information from the first communications device by using the second receive beam, and may send second information to the first communications device by using the second transmit beam.

In the second aspect, the second communications device may determine, in a synchronization phase, the second receive beam and the second transmit beam that are used to perform information transmission with the first communications device, so that the second receive beam and the second transmit beam are determined earlier, and no additional reference signal is required to implement beam alignment, so as to reduce a waste of time-frequency resources.

In one embodiment, in the aspect of sending the first feedback information to the first communications device based on the receive beam time sequence information by using the second transmit beam, the second communications device specifically performs the following operation:

when the receive beam time sequence information indicates at least one time sequence location, sending the first feedback information to the first communications device at each of the at least one time sequence location by using the second transmit beam. The sent first feedback information includes an identifier of the second communications device, so that after the first communications device receives the first feedback information, the first communications device can determine that a device that completes signal synchronization and beam alignment is the second communications device.

In one embodiment, when the receive beam time sequence information indicates at least one time sequence location, the receive beam time sequence information is further used to indicate a receiving direction of at least one receive beam of the first communications device, where an $i^{th}$ time sequence location corresponds to a receiving direction of a $j^{th}$ receive beam, the $i^{th}$ time sequence location belongs to the at least one time sequence location, the $i^{th}$ receive beam belongs to the at least one receive beam, and both i and j are positive integers.

It may be understood that the time sequence location in the receive beam time sequence information is a location in a time window, the time window may include all time sequence locations indicated by the receive beam time sequence location information, and both i and j are positive integers. In a correspondence, one time sequence location uniquely corresponds to a receiving direction of one receive beam, and a receiving direction of one receive beam uniquely corresponds to one time sequence location. In another correspondence, one time sequence location uniquely corresponds to a receiving direction of one receive beam, and a receiving direction of one receive beam may correspond to one or more time sequence locations. This is not limited in this embodiment of this application.

In one embodiment, in the aspect of sending the first feedback information to the first communications device based on the receive beam time sequence information by using the second transmit beam, the second communications device specifically performs the following operation: sending the first feedback information at a target time sequence location by using the second transmit beam, where the target time sequence location is determined from the at least one time sequence location based on the second transmit beam and the receiving direction of the at least one receive beam. In this way, the second communications device reduces a quantity of times of sending the first feedback information, to reduce a waste of time-frequency resources and improve efficiency of transmitting the first feedback information.

In one embodiment, when the synchronization signal block is received on a plurality of receive beams, the second receive beam is a receive beam that is in the plurality of receive beams and that has highest received signal strength. The plurality of receive beams herein belong to the D receive beams of the second communications device. In this way, the second communications device more accurately receives information about the first communications device by using the second receive beam.

In one embodiment, the synchronization signal block further includes an identifier of the synchronization signal block; and the first feedback information further includes an identifier of a synchronization signal block received by the second communications device by using the second receive beam, so that the first communications device determines a first transmit beam based on the identifier of the synchronization signal block that is in the first feedback information.

In one embodiment, the first information may be data, control information, HARQ feedback information, a reference signal, a training sequence, or other information received by the second communications device from the first communications device. The second information may be data, control information, HARQ feedback information, a reference signal, a training sequence, or other information sent by the second communications device to the first communications device. The first information and the second information are not limited in this embodiment of this application.

In one embodiment, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH. The indication herein may include an explicit indication or an implicit indication. The indicated information may be directly indicated through the explicit indication, and when the implicit indication is used, a quantity of occupied bits may be reduced, and security of the indicated information may be improved.

According to a third aspect, an embodiment of this application provides a beam determining method, including:
receiving, by a second communications device, a synchronization signal block from a first communications device by using D receive beams, where the synchronization signal block includes an identifier of the first communications device, receive beam time sequence information of the first communications device, and an identifier of the synchronization signal block, and the receive beam time sequence information is used to indicate a time sequence location at which the first communications device receives feedback information; determining a second receive beam based on a receive beam that is in the D receive beams and on which the synchronization signal block is received, sending F pieces of first feedback information to the first communications device based on the receive beam time sequence information by using E transmit beams, where each of the F pieces of first feedback information includes an identifier of a synchronization signal block received by the second communications device by using the second receive beam and an identifier of the first feedback information, and receiving second feedback information from the first communications device, where the second feedback information includes the identifier of the first feedback information received by the first communications device; and determining a second transmit beam based on the identifier of the first feedback information received by the first communications device, where the second transmit beam is a transmit beam that is in the E transmit beams and on which the first feedback information received by the first communications device is sent.

The second communications device may receive first information from the first communications device by using the second receive beam, and may send second information to the first communications device by using the second transmit beam.

In the third aspect, the second communications device may determine, in a synchronization phase, the second receive beam and the second transmit beam that are used to perform information transmission with the first communications device, so that the second receive beam and the second transmit beam are determined earlier, and no additional reference signal is required to implement beam alignment, so as to reduce a waste of time-frequency resources.

In one embodiment, in the aspect of sending the F pieces of first feedback information to the first communications device based on the receive beam time sequence information by using the E transmit beams, the second communications device specifically performs the following operation: when the receive beam time sequence information indicates at least one time sequence location, sending one piece of first feedback information at each of the at least one time sequence location by using each of the E transmit beams. The sent first feedback information includes an identifier of the second communications device, so that after the first communications device receives the first feedback information, the first communications device can determine that a device that completes signal synchronization and beam alignment is the second communications device.

In one embodiment, when the receive beam time sequence information indicates at least one time sequence location, the receive beam time sequence information is further used to indicate a receiving direction of at least one receive beam of the first communications device, where an $i^{th}$ time sequence location corresponds to a receiving direction of a $j^{th}$ receive beam, the $i^{th}$ time sequence location belongs to the at least one time sequence location, the $i^{th}$ receive beam belongs to the at least one receive beam, and both i and j are positive integers. It may be understood that the time sequence location in the receive beam time sequence information is a location in a time window, and the time window may include all time sequence locations indicated by the receive beam time sequence location information. In a correspondence, one time sequence location uniquely corresponds to a receiving direction of one receive beam, and a receiving direction of one receive beam uniquely corresponds to one time sequence location. In another correspondence, one time sequence location uniquely corresponds to a receiving direction of one receive beam, and a receiving direction of one receive beam may correspond to one or more time sequence locations. This is not limited in this embodiment of this application.

In one embodiment, in the aspect of sending the F pieces of first feedback information to the first communications device based on the receive beam time sequence information by using the E transmit beams, the second communications device specifically performs the following operation: when the receive beam time sequence information indicates the at least one time sequence location, sending, by the second communications device by using an $m^{th}$ transmit beam, one piece of first feedback information at a target time sequence location corresponding to the $m^{th}$ transmit beam, where the $m^{th}$ transmit beam is any one of the E transmit beams, the target time sequence location corresponding to the $m^{th}$ transmit beam is determined from the at least one time sequence location based on the $m^{th}$ transmit beam and the receiving direction of the at least one receive beam, and m is a positive integer. In this way, the second communications device reduces a quantity of times of sending the first feedback information, to reduce a waste of time-frequency resources and improve efficiency of transmitting the first feedback information.

In one embodiment, when the synchronization signal block is received on a plurality of receive beams, the second receive beam is a receive beam that is in the plurality of receive beams and that has highest received signal strength. In this way, the second communications device more accurately receives information about the first communications device by using the second receive beam.

In one embodiment, the first information may be data, control information, HARQ feedback information, a reference signal, a training sequence, or other information received by the second communications device from the first communications device. The second information may be data, control information, HARQ feedback information, a reference signal, a training sequence, or other information sent by the second communications device to the first communications device. The first information and the second information are not limited in this embodiment of this application.

In one embodiment, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH. The indication herein may include an explicit indication or an implicit indication. The indicated information may be directly indicated through the explicit indication, and when the implicit indication is used, a quantity of occupied bits may be reduced, and security of the indicated information may be improved.

According to a fourth aspect, an embodiment of this application provides a communications device. The communications device is a first communications device, and the first communications device includes:

a sending unit, configured to send B synchronization signal blocks to a second communications device by using A transmit beams, where each of the B synchronization signal blocks includes an identifier of the first communications device and receive beam time sequence information of the first communications device, the receive beam time sequence information is used to indicate a time sequence location at which the first communications device receives feedback information, and both A and B are positive integers;

a receiving unit, configured to receive first feedback information from the second communications device based on the time sequence location by using C receive beams, where C is a positive integer; and a processing unit, configured to determine a first receive beam based on a receive beam that is in the C receive beams and on which the first feedback information is received, where the processing unit is further configured to determine a first transmit beam based on the first receive beam or the first feedback information, where the first transmit beam belongs to the A transmit beams;

the sending unit is further configured to send first information to the second communications device by using the first transmit beam; and the receiving unit is further configured to receive second information from the second communications device by using the first receive beam.

Optionally, the first communications device may further implement some or all optional implementations of the first aspect.

According to a fifth aspect, an embodiment of this application provides a communications device. The communications device is a second communications device, and the second communications device includes:

a receiving unit, configured to receive a synchronization signal block from a first communications device by using D receive beams, where the synchronization signal block includes an identifier of the first communications device and receive beam time sequence information of the first communications device, the receive beam time sequence information is used to indicate a time sequence location at which the first communications device receives feedback information, and D is a positive integer;

a processing unit, configured to determine a second receive beam based on a receive beam that is in the D receive beams and on which the synchronization signal block is received, where the processing unit is further configured to determine a second transmit beam based on the second receive beam; and a sending unit, configured to send first feedback information to the first communications device based on the receive beam time sequence information by using the second transmit beam, where the sending unit is further configured to receive first information from the first communications device by using the second receive beam; and the receiving unit is further configured to send second information to the first communications device by using the second transmit beam.

Optionally, the second communications device may further implement some or all optional implementations of the second aspect.

According to a sixth aspect, an embodiment of this application provides a communications device. The communications device is a second communications device, and the second communications device includes:

a receiving unit, configured to receive a synchronization signal block from a first communications device by using D receive beams, where the synchronization signal block includes an identifier of the first communications device, receive beam time sequence information of the first communications device, and an identifier of the synchronization signal block, the receive beam time sequence information is used to indicate a time sequence location at which the first communications device receives feedback information, and D is a positive integer;

a processing unit, configured to determine a second receive beam based on a receive beam that is in the D receive beams and on which the synchronization signal block is received; and a sending unit, configured to send F pieces of first feedback information to the first communications device based on the receive beam time sequence information by using E transmit beams, where each of the F pieces of first feedback information includes an identifier of a synchronization signal block received by the second communications device by using the second receive beam and an identifier of the first feedback information, and E and F are positive integers, where the receiving unit is further configured to receive second feedback information from the first communications device, where the second feedback information includes the identifier of the first feedback information received by the first communications device;

the processing unit is further configured to determine a second transmit beam based on the identifier of the first feedback information received by the first communications device, where the second transmit beam is a transmit beam that is in the E transmit beams and on which the first feedback information received by the first communications device is sent;

the sending unit is further configured to receive first information from the first communications device by using the second receive beam; and the receiving unit is further configured to send second information to the first communications device by using the second transmit beam.

Optionally, the second communications device may further implement some or all optional implementations of the third aspect.

According to a seventh aspect, a communications device is provided. The communications device may be the device in the foregoing method design, or may be a chip disposed in the device. The device includes: a memory, configured to store computer executable program code; a transceiver; and a processor, where the processor is coupled to the memory and the transceiver. The program code stored in the memory includes an instruction, and when the processor executes the instruction, the communications apparatus is enabled to perform the method performed by the communications device according to any one of the designs of the first aspect, the second aspect, and the third aspect.

According to an eighth aspect, a computer program product is provided. The computer program product includes computer program code, and when the computer program code is run on a computer, the computer is enabled to perform the method according to any one of the first aspect to the third aspect and the implementations of the first aspect to the third aspect.

According to a ninth aspect, a computer readable medium is provided. The computer readable medium stores program code, and when the computer program code is run on a computer, the computer is enabled to perform the method according to any one of the first aspect to the third aspect and the implementations of the first aspect to the third aspect.

According to a tenth aspect, a chip is provided, and includes a processor and a memory. The memory is configured to store a computer program, the processor is configured to invoke the computer program from the memory and run the computer program, and the computer program is used to implement the method according to any one of the first aspect to the third aspect and the implementations of the first aspect to the third aspect.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

The following describes the embodiments of this application with reference to accompanying drawings in the embodiments of this application.

Figure 1:
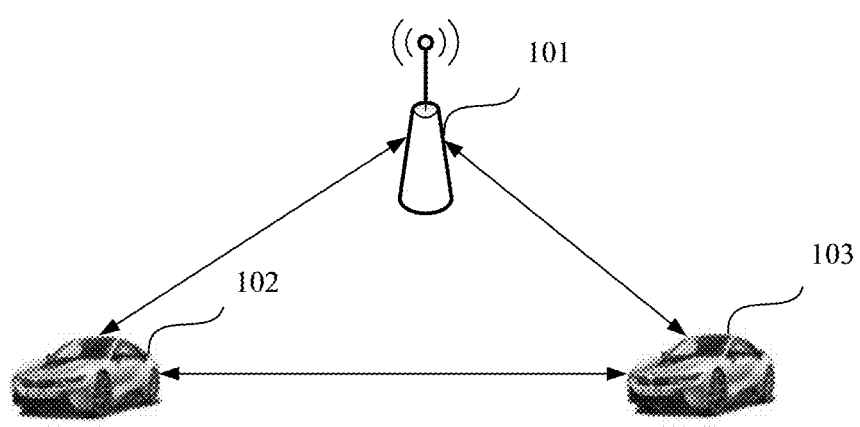
FIG. 1 is a schematic diagram of an architecture of a V2X communications system according to an embodiment of this application.

FIG. 1 is a schematic diagram of an architecture of a V2X communications system according to an embodiment of this application. As shown in FIG. 1, the architecture of the V2X communications system includes V2V communication and vehicle-to-network (V2N) communication. The communications system includes a network device 101, a vehicle 102, and a vehicle 103. The V2V communication includes communication between the vehicle 102 and the vehicle 103. The V2N communication includes communication between the vehicle 102 or the vehicle 103 and the base station 101.

In a V2X communication scenario, vehicles may communicate with each other through a side link (SL). The SL communication is direct communication between the vehicles. In other words, the vehicles directly communicate with each other without forwarding data by the network device.

In actual communication, beam alignment needs to be completed for direct communication between the vehicle 102 and the vehicle 103. Beam alignment means that the vehicle 102 determines a transmit beam used to send information to the vehicle 103 and determines a receive beam used to receive information from the vehicle 103, and similarly, the vehicle 103 determines a transmit beam used to send information to the vehicle 102 and determines a receive beam used to receive information from the vehicle 102.

In new radio (NR), beam alignment between a communications device and a network device may be completed through downlink synchronization and random access together. However, in NR-V2V/V2P communication, there is no random access mechanism between communications devices, and therefore beam alignment can be implemented only through uplink feedback in another manner. According to an existing solution, in an example of the V2V communication, to implement beam alignment between the vehicle 102 and the vehicle 103, signal synchronization needs to be first completed between the vehicle 102 and the vehicle 103, and then the network device sends a downlink reference signal to perform beam training. This brings two problems: (1) The reference signal is sent after a synchronization signal frame; and as a result, beam alignment between the vehicle 102 and the vehicle 103 is implemented after signal synchronization is completed, causing an increase in a delay. (2) The reference signal used for beam training occupies additional time-frequency resources.

In an implementation solution in this embodiment of this application, the vehicle 102 sends B synchronization signal blocks to the vehicle 103 by using A transmit beams, where each of the B synchronization signal blocks includes an identifier of the vehicle 102 and receive beam time sequence information of the vehicle 102, and the receive beam time sequence information is used to indicate a time sequence location at which the vehicle 102 receives feedback information. The vehicle 103 receives the synchronization signal block from the vehicle 102 by using D receive beams, and determines a second receive beam based on a receive beam that is in the D receive beams and on which the synchronization signal block is received. The vehicle 103 determines a second transmit beam based on the second receive beam. The vehicle 103 sends first feedback information to the vehicle 102 based on the receive beam time sequence information by using the second transmit beam. The vehicle 102 receives the first feedback information from the vehicle 103 based on the time sequence location by using C receive beams. The vehicle 102 determines a first receive beam based on a receive beam that is in the C receive beams and on which the first feedback information is received. The vehicle 102 determines a first transmit beam based on the first receive beam. In this way, in this solution, beam alignment between the vehicle 102 and the vehicle 103 is implemented in a synchronization phase. In other words, beam alignment between the vehicle 101 and the vehicle 102 is completed earlier, and no additional reference signal is required to implement beam alignment, so as to reduce a waste of time-frequency resources.

In another implementation solution in this embodiment of this application, the vehicle 102 sends B synchronization signal blocks to the vehicle 103 by using A transmit beams, where each of the B synchronization signal blocks includes an identifier of the vehicle 102, receive beam time sequence information of the vehicle 102, and an identifier of the synchronization signal block, and the receive beam time sequence information is used to indicate a time sequence location at which the vehicle 102 receives feedback information. The vehicle 103 receives the synchronization signal block from the vehicle 102 by using D receive beams, and determines a second receive beam based on a receive beam that is in the D receive beams and on which the synchronization signal block is received. The vehicle 103 sends F pieces of first feedback information to the vehicle 102 based on the receive beam time sequence information by using E transmit beams, where each of the F pieces of first feedback information includes an identifier of a synchronization signal block received by the vehicle 103 by using the second receive beam and an identifier of the first feedback information. The vehicle 102 receives the first feedback information from the vehicle 103 based on the receive beam time sequence information by using C receive beams, determines a first receive beam based on a receive beam that is in the C receive beams and on which the first feedback information is received, and determines a first transmit beam based on the identifier of the synchronization signal block that is included in the first feedback information received by using the first receive beam. The vehicle 102 sends second feedback information to the vehicle 103 by using the first transmit beam, where the second feedback information includes the identifier of the first feedback information received by the vehicle 102. The vehicle 103 receives the second feedback information from the vehicle 102. The vehicle 103 determines a second transmit beam based on the second feedback information. In this way, in this solution, beam alignment between the vehicle 102 and the vehicle 103 is implemented in a synchronization phase. In other words, beam alignment between the vehicle 101 and the vehicle 102 is completed earlier, and no additional reference signal is required to implement beam alignment, so as to reduce a waste of time-frequency resources.

The beam determining method in the embodiments of this application may be applied to a V2V communications system, and may be further applied to a vehicle-to-pedestrian (V2P) communications system, a vehicle-to-infrastructure (V2I) communications system, and the like for direct communication.

The network device in the embodiments of this application may include base stations in various forms, for example, a macro base station, a micro base station (also referred to as a small cell), a relay station, and an access point. In systems using different radio access technologies, devices having a base station function may have different names. For example, in a 5th generation (5th generation, 5G) system, the device is referred to as a gNB; in an LTE system, the device is referred to as an evolved NodeB (eNB or eNodeB); and in a 3rd generation (3G) system, the device is referred to as a NodeB (NodeB).

A first communications device and a second communications device in the embodiments of this application may be a vehicle-mounted terminal, user equipment (UE), a handheld terminal, a notebook computer, a subscriber unit (subscriber unit), a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, another device, or the like.

Figure 2:
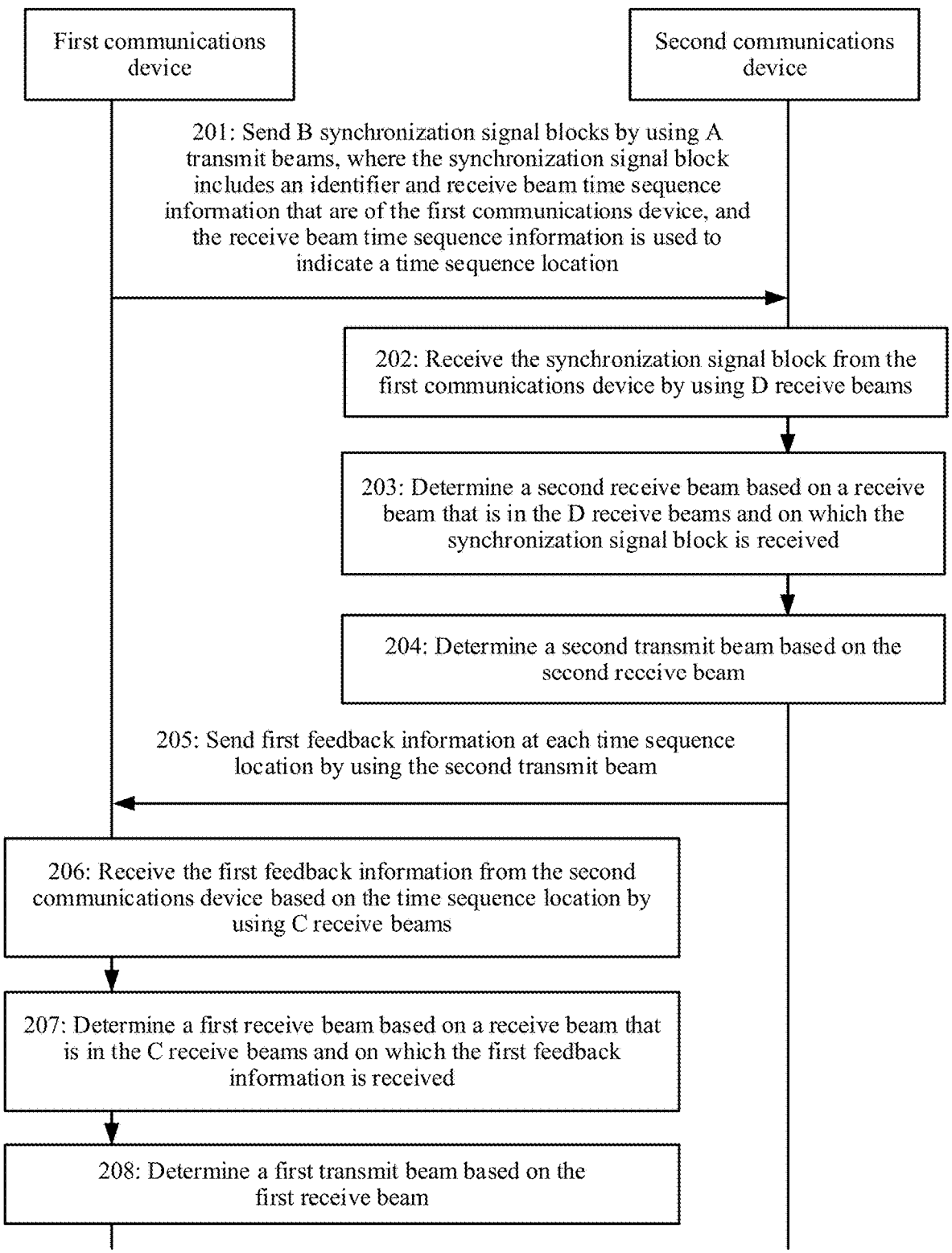
FIG. 2 is a schematic flowchart of a beam determining method according to an embodiment of this application.

Based on the system architectural diagram shown in FIG. 1, FIG. 2 shows a beam determining method according to an embodiment of this application. As shown in FIG. 2, the beam determining method includes operation 201 to operation 208.

201: A first communications device sends B synchronization signal blocks to a second communications device by using A transmit beams.

Each of the B synchronization signal blocks sent by the first communications device includes an identifier of the first communications device and receive beam time sequence information of the first communications device, the receive beam time sequence information is used to indicate a time sequence location at which the first communications device receives feedback information, and both A and B are positive integers.

The identifier of the first communications device is used to uniquely identify the first communications device, for example, may be a hardware identification code of the communications device. A specific form of the identifier of the first communications device is not limited in this embodiment of this application.

The time sequence location indicated by the receive beam time sequence information may be indicated by at least one of a subframe location, a slot location, and a symbol location in a radio frame. For example, 1 radio frame=10 subframes=10 ms=20 slots=140 symbols. The time sequence location indicated by the receive beam time sequence information may be a location of the first symbol in the fifth slot in the second subframe, or may be the $18^{th}$ slot in the fifth subframe. It may be understood that the time sequence location herein is a location in a radio frame, and is not a fixed location in a specific radio frame. Optionally, the receive beam time sequence information may indicate one or more time sequence locations. This is not limited in this embodiment of this application.

For example, the first communications device may send the B synchronization signal blocks in a beam sweeping manner. The beam sweeping manner in the embodiments of this application specifically means that beams in different directions are formed by using a beamforming algorithm or the like, and then information is received or sent by using the beams in the different directions. The beams in the different directions may jointly cover a 360° range or jointly cover a specified angular range. In the embodiment shown in FIG. 2, the first communications device may send the B synchronization signal blocks by using transmit beams in different directions.

In the embodiment shown in FIG. 2, a value relationship between A and B may not be limited, and a correspondence between the A transmit beams and the B synchronization signal blocks may not be limited. In a first implementation solution, one or more synchronization signal blocks may be sent on one transmit beam. For example, if the A transmit beams include transmit beams tx1, tx2, and tx3, and the B synchronization signal blocks include synchronization signal blocks s1, s2, s3, and s4, a manner is: tx1->s1, tx2->s2 and s3, and tx3->s4. Herein, tx1->s1 indicates that the synchronization signal block s1 is sent by using the transmit beam tx1; tx2->s2 and s3 indicates that the synchronization signal block s2 and the synchronization signal block s3 are sent by using the transmit beam tx2; and tx3->s4 indicates that the synchronization signal block s4 is sent by using the transmit beam tx3. In another implementation solution, the transmit beam is in a one-to-one correspondence with the synchronization signal block. In other words, A and B are equal in value, one transmit beam uniquely corresponds to one synchronization signal block, and one synchronization signal block uniquely corresponds to one transmit beam. For example, if the A transmit beams include transmit beams tx1, tx2, and tx3, and the B synchronization signal blocks include synchronization signal blocks s1, s2, and s3, a manner is: tx1->s1, tx2->s2, and tx3->s3. In another implementation solution, a same synchronization signal block may be sent on different transmit beams. For example, if the A transmit beams include transmit beams tx1, tx2, and tx3, and the B synchronization signal blocks include synchronization signal blocks s1, s2, s3, and s4, a manner is: tx1->s1 and s2, tx2->s2 and s3, and tx3->s4. Herein, tx1->s1 and s2 indicates that the synchronization signal block s1 and the synchronization signal block s2 are sent by using the transmit beam tx1; tx2->s2 and s3 indicates that the synchronization signal block s2 and the synchronization signal block s3 are sent by using the transmit beam tx2; and tx3->s4 indicates that the synchronization signal block s4 is sent by using the transmit beam tx3.

The B synchronization signal blocks may belong to a same synchronization signal burst set. For example, a synchronization signal burst set is defined in an NR communications system. Based on this communications system, the B synchronization signal blocks sent by the first communications device may belong to the same synchronization signal burst set, and the first communications device may separately send the synchronization signal blocks by using different transmit beams, to implement beam sweeping.

The synchronization signal block s1 and the synchronization signal block s2 may include a same identifier of the first communications device, and may include same receive beam time sequence information. The synchronization signal block s1 and the synchronization signal block s2 are two different synchronization signal blocks in the B synchronization signal blocks. In this way, regardless of which synchronization signal block is received, the second communications device can uniquely determine the receive beam time sequence information of the first communications device.

202: The second communications device receives the synchronization signal block from the first communications device by using D receive beams.

For example, the second communications device may receive the synchronization signal block in a beam sweeping manner. It may be understood that that the second communications device receives the synchronization signal block by using D receive beams does not indicate that the synchronization signal block is received on each of the D receive beams, but indicates that the second communications device receives information by using the D receive beams, to receive the synchronization signal block. Herein, D is a positive integer. A quantity of receive beams is not limited in this embodiment of this application.

Operation 201 and operation 202 are not performed in a sequential order.

203: The second communications device determines a second receive beam based on a receive beam that is in the D receive beams and on which the synchronization signal block is received.

After the second communications device receives the synchronization signal block by using the D receive beams, if the synchronization signal block is received on only one of the D receive beams, the second communications device determines the receive beam on which the synchronization signal block is received as the second receive beam.

If the synchronization signal block is received on two or more receive beams in the D receive beams, the second communications device selects one receive beam from the two or more receive beams on which the synchronization signal block is received, and determines the receive beam as the second receive beam. The second communications device may determine signal strength of each receive beam on which the synchronization signal block is received, and determine a receive beam with highest signal strength as the second receive beam.

204: The second communications device determines a second transmit beam based on the second receive beam.

The second communications device may directly determine the second transmit beam based on the second receive beam. For example, in a case of channel reciprocity, the second communications device may determine an antenna configuration parameter corresponding to the second transmit beam based on an antenna configuration parameter corresponding to the second receive beam, to directly determine the second transmit beam. The channel reciprocity means that features of an uplink channel and a downlink channel are basically the same.

After determining the second receive beam and the second transmit beam, with reference to the identifier of the first communications device that is included in the synchronization signal block, the second communications device may receive first information from the first communications device by using the second receive beam, and may further send second information to the first communications device by using the second transmit beam.

205: The second communications device sends, by using the second transmit beam, first feedback information to the first communications device at the time sequence location included in the receive beam time sequence information.

The second communications device sends the first feedback information by using the receive beam time sequence information included in the received synchronization signal block. The second communications device may determine the second transmit beam in operation 204, and send, by using the second transmit beam, the first feedback information to the first communications device at the time sequence location included in the receive beam time sequence information.

When the receive beam time sequence information includes at least one time sequence location, the second communications device sends one piece of first feedback information at each time sequence location by using the second transmit beam. The sent first feedback information includes an identifier of the second communications device, so that after the first communications device receives the first feedback information, the first communications device can determine that a device that completes signal synchronization and beam alignment is the second communications device. The identifier of the second communications device is used to uniquely identify the second communications device, for example, may be a hardware identification code of the communications device. A specific form of the identifier of the second communications device is not limited in this embodiment of this application.

206: The first communications device receives the first feedback information from the second communications device based on the time sequence location by using C receive beams.

For example, the first communications device may receive the first feedback information in a beam sweeping manner. It may be understood that that the first communications device receives the first feedback information by using C receive beams does not indicate that the first feedback information is received on each of the C receive beams, but indicates that the first communications device receives information by using the C receive beams, to receive the first feedback information. Herein, C is a positive integer. A quantity of receive beams is not limited in this embodiment of this application.

Further, because the time sequence location at which the first communications device receives the feedback information is notified to the second communications device by using the receive beam time sequence information, the first communications device may receive the first feedback information at the notified time sequence location.

In one embodiment, there is a specific correspondence between at least one time sequence location included in the receive beam time sequence information and the C receive beams of the first communications device. Details are as follows: An $i^{th}$ time sequence location corresponds to a receiving direction of a $j^{th}$ receive beam, the $i^{th}$ time sequence location belongs to the at least one time sequence location, and the $i^{th}$ receive beam belongs to the C receive beams. It may be understood that the time sequence location in the receive beam time sequence information is a location in a time window, and the time window may include all time sequence locations indicated by the receive beam time sequence location information. For example, the time window is a radio frame. In this way, the first communications device may receive the first feedback information in a radio frame 1 based on the time sequence location by using the C receive beams, or may receive the first feedback information in another radio frame 2 based on the time sequence location by using the C receive beams. A location of the time window used by the first communications device to receive the first feedback information and a quantity of time windows are not limited in this embodiment of this application.

A correspondence between a receiving direction of a receive beam and a time sequence location in a time window is described by using an example. For example, there are three receive beams, and receiving directions corresponding to the three receive beams are respectively rx1-D1, rx2-D2, and rx3-D4. The time sequence locations indicated by the receive beam time sequence information include T1, T2, and T3. As shown in Table 1, it can be learned that one time sequence location uniquely corresponds to a receiving direction of one receive beam, and a receiving direction of one receive beam uniquely corresponds to one time sequence location. In this way, the first communications device receives the first feedback information from the second communications device at the $i^{th}$ time sequence location by using the $j^{th}$ receive beam corresponding to the $i^{th}$ time sequence location.

TABLE 1

A correspondence between a receiving direction and a time sequence location

| Receiving direction of a receive beam | Time sequence location |
|---|---|
| rx1-D1 | T1 |
| rx2-D2 | T2 |
| rx3-D3 | T3 |

For another example, there are three receive beams, and the receive beam time sequence information indicates that a receiving direction of a receive beam rx1 is rx1-D1, a receiving direction of a receive beam rx2 is rx2-D2, and a receiving direction of a receive beam rx3 is rx3-D2. The time sequence locations indicated by the receive beam time sequence information include T1, T2, T3, T4, and T5. As shown in Table 2, it can be learned that one time sequence location uniquely corresponds to a receiving direction of one receive beam, and a receiving direction of one receive beam may correspond to one or more time sequence locations. In this way, the first communications device receives the first feedback information from the second communications device at the $i^{th}$ time sequence location by using the $j^{th}$ receive beam corresponding to the $i^{th}$ time sequence location.

TABLE 2

Another correspondence between a receiving direction and a time sequence location

| Receiving direction of a receive beam | Time sequence location |
|---|---|
| rx1-D1 | T1 and T2 |
| rx2-D2 | T3 |
| rx3-D3 | T4 and T5 |

Operation 206 is performed after operation 201, and operation 206 and operation 202 are not performed in a sequential order.

207: The first communications device determines a first receive beam based on a receive beam that is in the C receive beams and on which the first feedback information is received.

After the first communications device receives the first feedback information by using the C receive beams, if the first feedback information is received on only one of the C receive beams, the first communications device determines the receive beam on which the synchronization signal block is received as the first receive beam.

If the first feedback information is received on two or more receive beams in the C receive beams, the first communications device selects one receive beam from the two or more receive beams on which the first feedback information is received, and determines the receive beam as the first receive beam. The first communications device may determine signal strength of each receive beam on which the first feedback information is received, and determine a receive beam with highest signal strength as the first receive beam.

208: The first communications device determines a first transmit beam based on the first receive beam.

The first communications device may directly determine the first transmit beam based on the first receive beam. For example, in a case of channel reciprocity, the first communications device may determine an antenna configuration parameter corresponding to the first transmit beam based on an antenna configuration parameter corresponding to the first receive beam, to directly determine the first transmit beam.

For example, in a case of channel reciprocity, in the embodiment shown in FIG. 2, a quantity of transmit beams of the first communications device may be equal to a quantity of receive beams, and one transmit beam uniquely corresponds to one receive beam. In this way, the first transmit beam determined in operation 208 belongs to the A transmit beams of the first communications device.

After determining the first receive beam and the first transmit beam, with reference to the identifier of the second communications device that is included in the first feedback information, the first communications device may receive second information from the second communications device by using the first receive beam, and may further send first information to the second communications device by using the first transmit beam.

The first information may be data, control information, hybrid automatic repeat request (HARQ) feedback information, a reference signal, a training sequence (including but not limited to a preamble sequence and a midamble), or other information received by the second communications device from the first communications device. The second information may be data, control information, HARQ feedback information, a reference signal, a training sequence (including but not limited to a preamble and a midamble), or other information sent by the second communications device to the first communications device. The first information and the second information are not limited in this embodiment of this application.

In the embodiment shown in FIG. 2, in a synchronization phase, the first communications device may determine the first receive beam and the first transmit beam that are used to perform information transmission with the second communications device, and the second communications device may also determine the second receive beam and the second transmit beam that are used to perform information transmission with the first communications device. In this way, beam alignment between the first communications device and the second communications device is completed earlier, and no additional reference signal is required to implement beam alignment, so as to reduce a waste of time-frequency resources.

Figure 3:
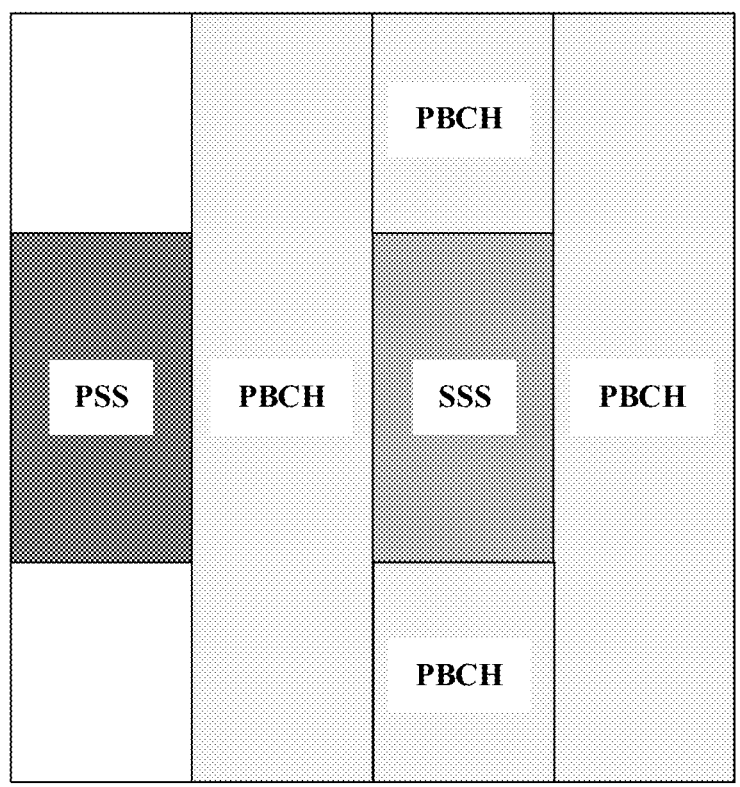
FIG. 3 is a schematic structural diagram of a synchronization signal block according to an embodiment of this application.

FIG. 3 is a schematic structural diagram of a synchronization signal block according to an embodiment of this application. As shown in FIG. 3, the synchronization signal block includes a primary synchronization signal (PSS), a secondary synchronization signal (SSS), and a physical broadcast channel (PBCH).

In the embodiment shown in FIG. 2, the synchronization signal block includes the identifier and the receive beam time sequence information that are of the first communications device, and the receive beam time sequence information is used to indicate the time sequence location at which the first communications device receives the feedback information. With reference to FIG. 3, the identifier of the first communications device may be indicated by the primary synchronization signal, the secondary synchronization signal, or the PBCH; and the beam time sequence information may be indicated by the primary synchronization signal, the secondary synchronization signal, or the PBCH.

The receive beam time sequence information is used as an example. In a first implementation solution, the receive beam time sequence information may be implicitly indicated by the primary synchronization signal or the secondary synchronization signal. For example, the primary synchronization signal may include a plurality of synchronization sequences. A correspondence between the synchronization sequence and the receive beam time sequence information is first determined, and the receive beam time sequence information is indicated by a sent synchronization sequence.

In a second implementation solution, the receive beam time sequence information may be explicitly indicated by the PBCH. For example, a target preset value may be written into a field part included in the PBCH, to indicate receive beam time sequence information corresponding to the target preset value. In this solution, a correspondence between a plurality of preset values and a plurality of pieces of receive beam time sequence information needs to be first determined.

In a third implementation solution, the receive beam time sequence information may be implicitly indicated by the PBCH. For example, the receive beam time sequence information may be indicated by a demodulation reference signal (DMRS) on the PBCH, a scrambling sequence used by the PBCH, or the like. In a manner, a correspondence between a plurality of DMRSs and receive beam time sequence information is determined, and receive beam time sequence information corresponding to a target DMRS is indicated by the target DMRS on the PBCH. In another manner, a correspondence between a plurality of scrambling sequences and receive beam time sequence information is determined, and receive beam time sequence information corresponding to a target scrambling sequence is indicated by the target scrambling sequence used by the PBCH.

For example, how to indicate the receive beam time sequence information by using the synchronization signal block is described above. The identifier of the first communications device may also be indicated in a same manner. For a specific manner of indicating the identifier of the first communications device, refer to detailed descriptions of indicating the receive beam time sequence information. Details are not described herein again.

FIG. 3 is merely a schematic structural diagram. A structure of the synchronization signal block is not limited in this application. For example, the synchronization signal block may include at least one of the PSS, the SSS, and the PBCH. In this way, in this application, the identifier of the first communications device may be indicated by the part included in the synchronization signal block, and the receive beam time sequence information of the first communications device may also be indicated by the part included in the synchronization signal block. For a specific manner of indicating the receive beam time sequence information, refer to the following detailed descriptions.

Figure 4:
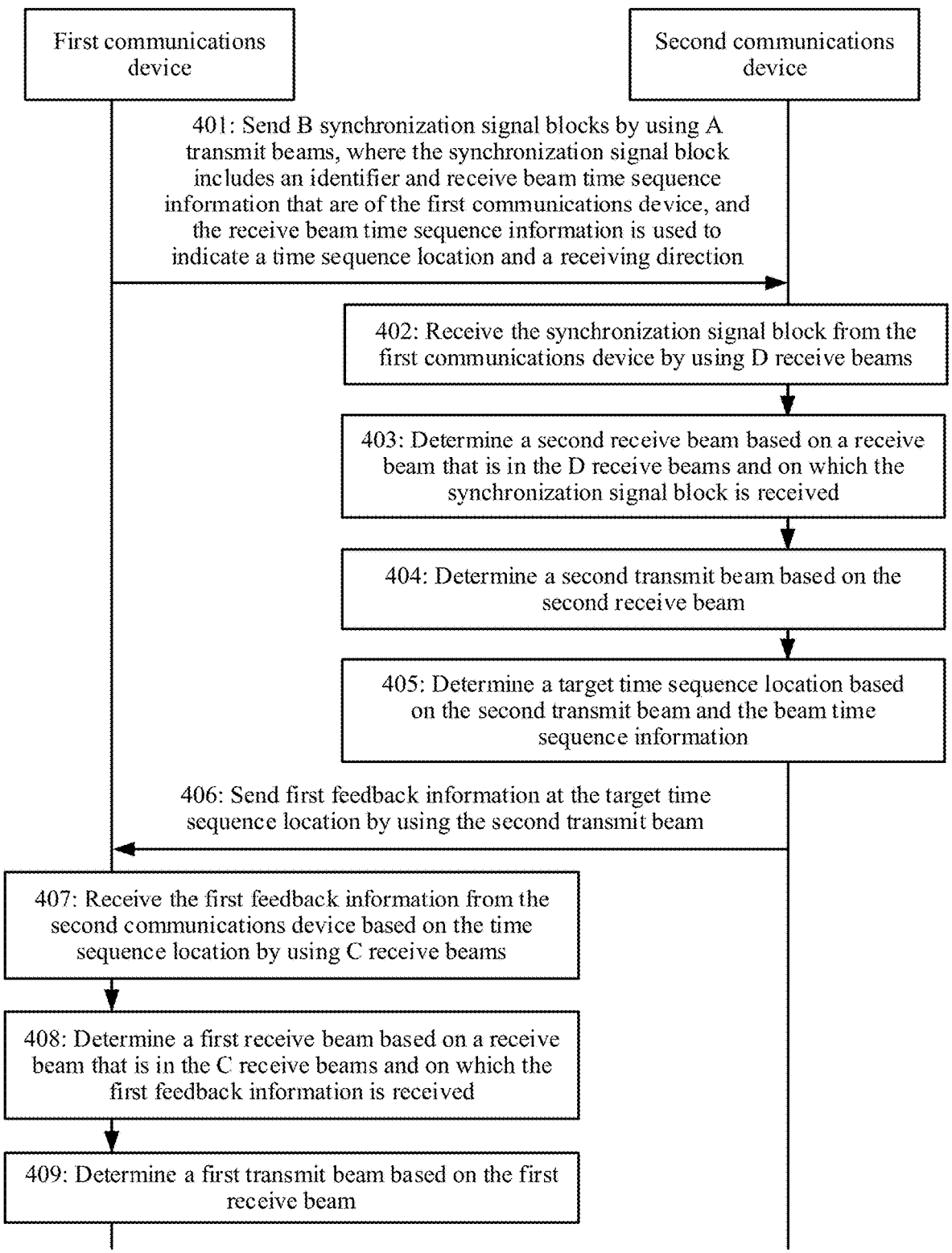
FIG. 4 is a schematic flowchart of another beam determining method according to an embodiment of this application.

Based on the system architectural diagram shown in FIG. 1, FIG. 4 shows another beam determining method according to an embodiment of this application. As shown in FIG. 4, the beam determining method includes operation 401 to operation 409.

401: A first communications device sends B synchronization signal blocks to a second communications device by using A transmit beams.

Herein, both A and B are positive integers. Each of the B synchronization signal blocks includes an identifier of the first communications device and receive beam time sequence information of the first communications device; the receive beam time sequence information is used to indicate a time sequence location at which the first communications device receives feedback information; and the receive beam time sequence information is further used to indicate receiving directions of C receive beams of the first communications device, an $i^{th}$ time sequence location corresponds to a receiving direction of a $j^{th}$ receive beam, the $i^{th}$ time sequence location belongs to the at least one time sequence location, and the $j^{th}$ receive beam belongs to the C receive beams. Herein, C is a positive integer, i is a positive integer, and j is a positive integer less than or equal to C.

It may be understood that the time sequence location in the receive beam time sequence information is a location in a time window, and the time window may include all time sequence locations indicated by the receive beam time sequence location information. For example, the time window is a radio frame. In this way, the first communications device may receive first feedback information in a radio frame 1 based on the time sequence location by using the C receive beams, or may receive first feedback information in another radio frame 2 based on the time sequence location by using the C receive beams. A location of the time window used by the first communications device to receive the first feedback information and a quantity of time windows are not limited in this embodiment of this application.

For a correspondence between a receiving direction of a receive beam and a time sequence location in a time window, refer to detailed descriptions of Table 1 and Table 2 in the embodiment shown in FIG. 2. Details are not described herein again. In a correspondence, one time sequence location uniquely corresponds to a receiving direction of one receive beam, and a receiving direction of one receive beam uniquely corresponds to one time sequence location. Alternatively, in another correspondence, one time sequence location uniquely corresponds to a receiving direction of one receive beam, and a receiving direction of one receive beam may correspond to one or more time sequence locations.

The identifier of the first communications device is used to uniquely identify the first communications device, for example, may be a hardware identification code of the communications device. A specific form of the identifier of the first communications device is not limited in this embodiment of this application.

The time sequence location indicated by the receive beam time sequence information may be indicated by at least one of a subframe location, a slot location, and a symbol location in a radio frame. For a specific manner of indicating the time sequence location, refer to detailed description in operation 201 in the embodiment shown in FIG. 2. Details are not described herein again.

For example, the first communications device may send the B synchronization signal blocks in a beam sweeping manner. The beam sweeping manner in the embodiments of this application specifically means that beams in different directions are formed by using a beamforming algorithm or the like, and then information is received or sent by using the beams in the different directions. The beams in the different directions may jointly cover a 360° range or jointly cover a specified angular range. In the embodiment shown in FIG. 4, the first communications device may send the B synchronization signal blocks by using transmit beams in different directions.

In the embodiment shown in FIG. 4, a value relationship between A and B may not be limited, and a correspondence between the A transmit beams and the B synchronization signal blocks may not be limited. For an optional correspondence, refer to detailed descriptions in operation 201 in the embodiment shown in FIG. 2. Details are not described herein again.

The B synchronization signal blocks may belong to a same synchronization signal burst set. For example, a synchronization signal burst set is defined in an NR communications system. Based on this communications system, the B synchronization signal blocks sent by the first communications device may belong to the same synchronization signal burst set, and the first communications device may separately send the synchronization signal blocks by using different transmit beams, to implement beam sweeping.

A synchronization signal block s1 and a synchronization signal block s2 include a same identifier of the first communications device, and include same receive beam time sequence information. The synchronization signal block s1 and the synchronization signal block s2 are two different synchronization signal blocks in the B synchronization signal blocks. In this way, regardless of which synchronization signal block is received, the second communications device can uniquely determine the receive beam time sequence information of the first communications device.

402: The second communications device receives the synchronization signal block from the first communications device by using D receive beams.

403: The second communications device determines a second receive beam based on a receive beam that is in the D receive beams and on which the synchronization signal block is received.

404: The second communications device determines a second transmit beam based on the second receive beam.

For operation 402 to operation 404, refer to detailed descriptions in operation 202 to operation 204 in the embodiment shown in FIG. 2. Details are not described herein again. A difference between the two embodiments lies in that information indicated by the receive beam time sequence information in the synchronization signal block is different.

405: The second communications device determines a target time sequence location based on the second transmit beam and the receive beam time sequence information.

When the receive beam time sequence information is used to indicate one time sequence location, the second communications device may determine, based on the correspondence between a receiving direction of a receive beam and a time sequence location in operation 401, that the receive beam time sequence information indicates one receiving direction that is of a receive beam and that corresponds to the time sequence location, and may determine the time sequence location as the target time sequence location.

When the receive beam time sequence information is used to indicate two or more time sequence locations, based on the correspondence between a receiving direction of a receive beam and a time sequence location in operation 401, in a first case, the receive beam time sequence information indicates that a receiving direction of one receive beam corresponds to the two or more time sequence locations; or in a second case, the receive beam time sequence information indicates that receiving directions of at least two receive beams correspond to the two or more time sequence locations. The following describes the two cases.

In the first case, for example, the receive beam time sequence information of the first communications device indicates that time sequence locations are T1 and T2, and indicates that a receiving direction of a receive beam rx1 is rx1-D1. In other words, the first communications device separately receives feedback information at T1 and T2 by using the receive beam rx1. In this way, the second communications device may determine at least one of T1 and T2 as the target time sequence location.

In the second case, for example, as shown in Table 3, the receive beam time sequence information of the first communications device indicates that time sequence locations are T1, T2, T3, T4, and T5, and indicates that a receiving direction of a receive beam rx1 is rx1-D1, a receiving direction of a receive beam rx2 is rx2-D2, and a receiving direction of a receive beam rx3 is rx3-D2. That the second communications device determines a target time sequence location based on the second transmit beam and the receive beam time sequence information is specifically as follows: The second communications device determines, from the receiving directions of the three receive beams, a target receiving direction based on a sending direction of the second transmit beam and the receiving directions rx1-D1, rx2-D2, and rx2-D2 of the three receive beams, where an included angle between the target receiving direction and the sending direction of the second transmit beam is smallest. If the target receiving direction is rx1-D1, the second communications device obtains the time sequence locations T1 and T2 corresponding to rx1-D1, and the second communications device may determine at least one of T1 and T2 as the target time sequence location. If the target receiving direction is rx2-D2, the second communications device may determine the time sequence location T3 as the target time sequence location.

TABLE 3

A correspondence between a receiving direction and a time sequence location

| Receiving direction of a receive beam | Time sequence location |
|---|---|
| rx1-D1 | T1 and T2 |
| rx2-D2 | T3 |
| rx3-D3 | T4 and T5 |

406: The second communications device sends first feedback information to the first communications device at the target time sequence location by using the second transmit beam.

The second communications device sends the first feedback information to the first communications device at the target time sequence location by using the second transmit beam. In this way, the second communications device reduces a quantity of times of sending the first feedback information, to reduce a waste of time-frequency resources and improve efficiency of transmitting the first feedback information.

The sent first feedback information includes an identifier of the second communications device, so that after the first communications device receives the first feedback information, the first communications device can determine that a device that completes signal synchronization and beam alignment is the second communications device. The identifier of the second communications device is used to uniquely identify the second communications device, for example, may be a hardware identification code of the communications device. A specific form of the identifier of the second communications device is not limited in this embodiment of this application.

407: The first communications device receives the first feedback information from the second communications device based on the time sequence location by using C receive beams.

408: The first communications device determines a first receive beam based on a receive beam that is in the C receive beams and on which the first feedback information is received.

409: The first communications device determines a first transmit beam based on the first receive beam.

For operation 407 to operation 409, refer to detailed descriptions in operation 206 to operation 208 in the embodiment shown in FIG. 2. Details are not described herein again.

After the first communications device determines the first receive beam and the first transmit beam, with reference to the identifier of the second communications device that is included in the first feedback information, the first communications device may receive second information from the second communications device by using the first receive beam, and may further send first information to the second communications device by using the first transmit beam. After determining the second receive beam and the second transmit beam, with reference to the identifier of the first communications device that is included in the synchronization signal block, the second communications device may receive first information from the first communications device by using the second receive beam, and may further send second information to the first communications device by using the second transmit beam.

The first information may be data, control information, HARQ feedback information, a reference signal, a training sequence (including but not limited to a preamble and a midamble), or other information received by the second communications device from the first communications device. The second information may be data, control information, HARQ feedback information, a reference signal, a training sequence (including but not limited to a preamble and a midamble), or other information sent by the second communications device to the first communications device. The first information and the second information are not limited in this embodiment of this application.

Based on the schematic structural diagram of the synchronization signal block shown in FIG. 3, the synchronization signal block in the embodiment shown in FIG. 4 also includes the identifier and the receive beam time sequence information that are of the first communications device. The receive beam time sequence information is used to indicate a time sequence location at which the first communications device receives feedback information and a receiving direction that is of a receive beam and that corresponds to the time sequence location. For a manner of indicating either of the identifier and the receive beam time sequence information that are of the first communications device, refer to specific descriptions in the embodiment shown in FIG. 3. Details are not described herein again.

In the embodiment shown in FIG. 2, in a synchronization phase, the first communications device may determine the first receive beam and the first transmit beam that are used to perform information transmission with the second communications device, and the second communications device may also determine the second receive beam and the second transmit beam that are used to perform information transmission with the first communications device. In this way, beam alignment between the first communications device and the second communications device is completed earlier, and no additional reference signal is required to implement beam alignment, so as to reduce a waste of time-frequency resources. In addition, because the receive beam time sequence information further carries the receiving direction corresponding to the time sequence location, the second communications device may determine, by using the information, the target time sequence location at which the first feedback information is sent, to reduce a waste of time-frequency resources and improve efficiency of transmitting the first feedback information, so that efficiency of determining the transmit beam and the receive beam is improved.

Figure 5A:
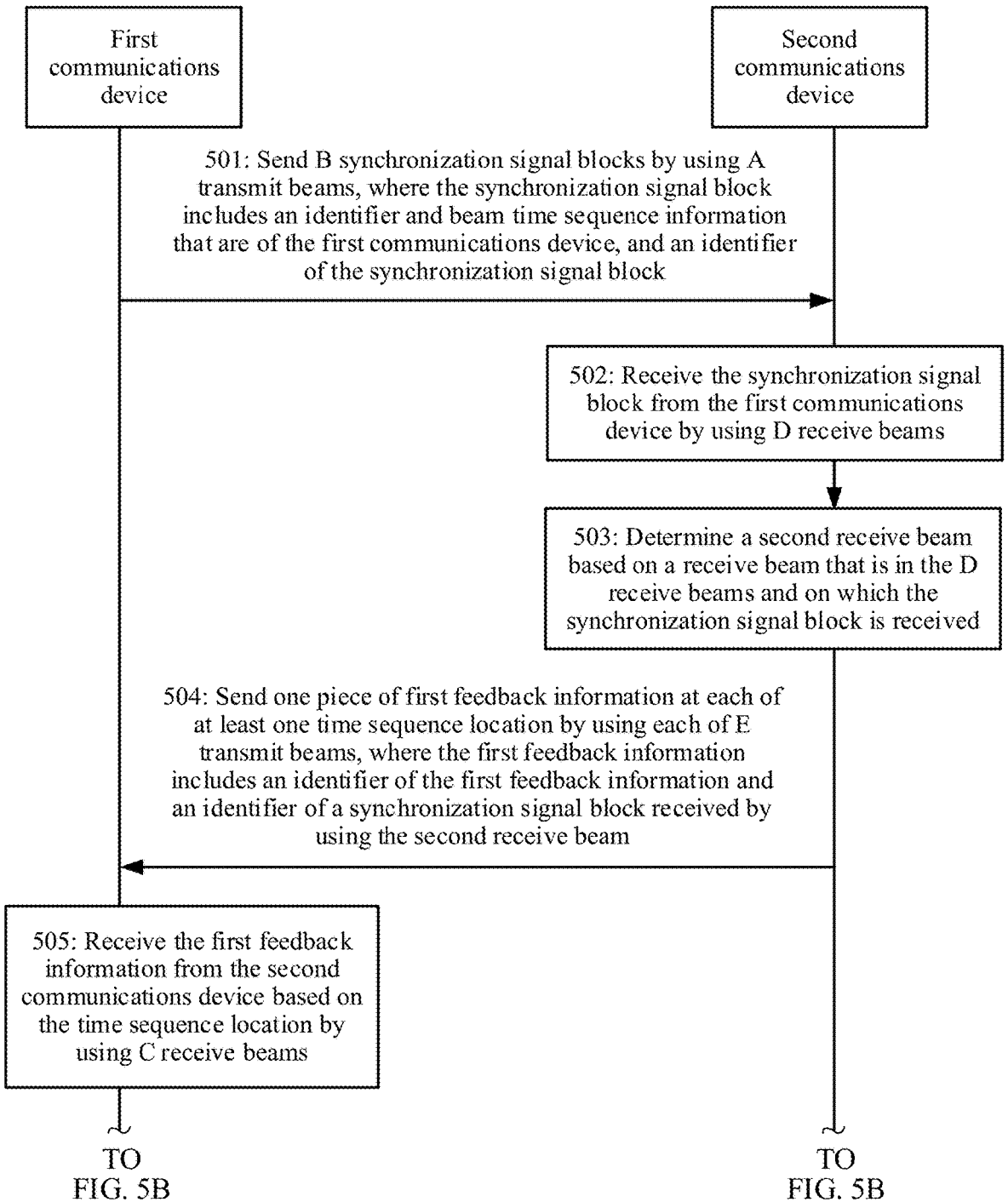
FIG. 5A and FIG. 5B are a schematic flowchart of another beam determining method according to an embodiment of this application.
Figure 5B:
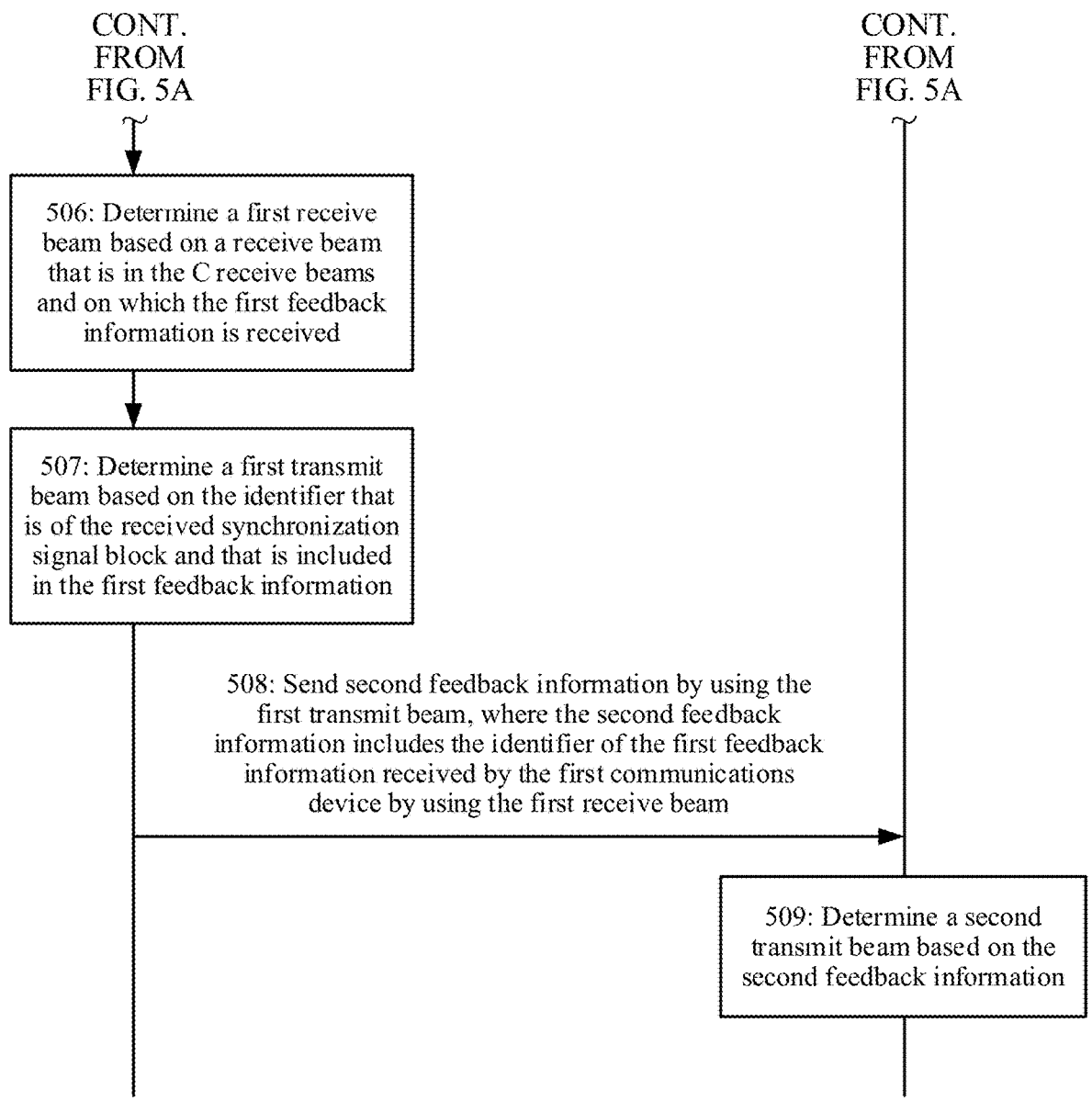

Based on the system architectural diagram shown in FIG. 1, FIG. 5A and FIG. 5B show another beam determining method according to an embodiment of this application. As shown in FIG. 5A and FIG. 5B, the beam determining method includes operation 501 to operation 509.

501: A first communications device sends B synchronization signal blocks to a second communications device by using A transmit beams.

Each of the B synchronization signal blocks sent by the first communications device includes an identifier of the first communications device, receive beam time sequence information of the first communications device, and an identifier of the synchronization signal block, and the receive beam time sequence information is used to indicate a time sequence location at which the first communications device receives feedback information.

In the embodiment shown in FIG. 5A and FIG. 5B, a $k^{th}$ synchronization signal block in the B synchronization signal blocks further includes an identifier of the $k^{th}$ synchronization signal block, where k is a positive integer less than or equal to B. In other words, one synchronization signal block corresponds to an identifier of the synchronization signal block, and identifiers of different synchronization signal blocks are different. The identifier of the synchronization signal block may alternatively be described by using a time index of the synchronization signal block. This is not limited in this embodiment of this application. The identifier of the first communications device is used to uniquely identify the first communications device, for example, may be a hardware identification code of the communications device. A specific form of the identifier of the first communications device is not limited in this embodiment of this application.

A synchronization signal block s1 and a synchronization signal block s2 may include a same identifier of the first communications device, and may include same receive beam time sequence information. An identifier of the synchronization signal block s1 is different from an identifier of the synchronization signal block s2. The synchronization signal block s1 and the synchronization signal block s2 are two different synchronization signal blocks in the B synchronization signal blocks. In this way, regardless of which synchronization signal block is received, the second communications device can uniquely determine the receive beam time sequence information of the first communications device.

The time sequence location indicated by the receive beam time sequence information may be indicated by at least one of a subframe location, a slot location, and a symbol location in a radio frame. For a specific manner of indicating the time sequence location, refer to detailed description in operation 201 in the embodiment shown in FIG. 2. Details are not described herein again.

For example, the first communications device may send the B synchronization signal blocks in a beam sweeping manner. The beam sweeping manner in the embodiments of this application specifically means that beams in different directions are formed by using a beamforming algorithm or the like, and then information is received or sent by using the beams in the different directions. The beams in the different directions may jointly cover a 360° range or jointly cover a specified angular range. In the embodiment shown in FIG. 5A and FIG. 5B, the first communications device may send the B synchronization signal blocks by using transmit beams in different directions.

In the embodiment shown in FIG. 5A and FIG. 5B, A is a positive integer less than or equal to B. An $s^{th}$ transmit beam in the A transmit beams corresponds to an identifier of at least one of the B synchronization signal blocks, where s is a positive integer less than or equal to A. In this embodiment, the transmit beam needs to be determined based on the identifier of the synchronization signal block. Therefore, one or more synchronization signal blocks may be sent on one transmit beam, and one synchronization signal block can be sent on only one transmit beam. In this way, the first communications device can uniquely determine one first transmit beam based on an identifier of one synchronization signal block.

In a first implementation, A and B are equal in value, one transmit beam uniquely corresponds to one synchronization signal block, and one synchronization signal block uniquely corresponds to one transmit beam. For example, if the A transmit beams include transmit beams tx1, tx2, and tx3, and the B synchronization signal blocks include synchronization signal blocks s1, s2, and s3, a manner is: tx1->s1, tx2->s2, and tx3->s3.

In a second implementation, A is less than B, and one synchronization signal block uniquely corresponds to one transmit beam. For example, if the A transmit beams include transmit beams tx1 and tx2, and the B synchronization signal blocks include synchronization signal blocks s1, s2, and s3, a manner is: tx1->s1 and s2, and tx2->s3.

The B synchronization signal blocks may belong to a same synchronization signal burst set. For example, a synchronization signal burst set is defined in an NR communications system. Based on this communications system, the B synchronization signal blocks sent by the first communications device may belong to the same synchronization signal burst set, and the first communications device may separately send the synchronization signal blocks by using different transmit beams, to implement beam sweeping.

502: The second communications device receives the synchronization signal block from the first communications device by using D receive beams.

503: The second communications device determines a second receive beam based on a receive beam that is in the D receive beams and on which the synchronization signal block is received.

For operation 502 and operation 503, refer to detailed descriptions in operation 202 and operation 203 in the embodiment shown in FIG. 2. Details are not described herein again. A difference between the two embodiments lies in that the synchronization signal block includes different information.

504: The second communications device sends one piece of first feedback information at each time sequence location by using each of E transmit beams.

The second communications device sends F pieces of first feedback information to the first communications device based on the receive beam time sequence information by using the E transmit beams. Herein, E and F are positive integers. When the receive beam time sequence information indicates at least one time sequence location, the second communications device sends one piece of first feedback information at each of the at least one time sequence location by using each of the E transmit beams. Each piece of first feedback information includes an identifier of a synchronization signal block received by the second communications device by using the second receive beam and an identifier of the first feedback information. Different first feedback information has different identifiers.

It may be understood that identifiers of first feedback information sent on a same transmit beam at a time sequence location T1 and a time sequence location T2 are different. In addition, identifiers of first feedback information sent on different transmit beams are different. In this way, a transmit beam used to send the first feedback information can be uniquely determined based on the identifier of the first feedback information.

For example, if the second communications device sends the first feedback information by using three transmit beams, and the receive beam time sequence information includes four time sequence locations, to implement operation 504, the second communications device may complete sending of the first feedback information in three time windows, where the four time sequence locations may be found in each time window. The three transmit beams are respectively tx1, tx2, and tx3, the three time windows are w1, w2, and w3, and the four time sequence locations are respectively T1, T2, T3, and T4.

TABLE 4

| A sending manner | | |
|---|---|---|
| Transmit beam | Time window | Time sequence location |
| tx1 | w1 | T1, T2, T3, and T4 |
| tx2 | w2 | T1, T2, T3, and T4 |
| tx3 | w3 | T1, T2, T3, and T4 |

For a sending manner, refer to Table 4. Specifically, in the time window w1, the second communications device sends one piece of first feedback information at each of the foregoing four time sequence locations by using tx1; in the time window w2, the second communications device sends one piece of first feedback information at each of the foregoing four time sequence locations by using tx2; and in the time window w3, the second communications device sends one piece of first feedback information at each of the foregoing four time sequence locations by using tx3. In this way, the first feedback information is sent on each transmit beam at each time sequence location in a traversal manner.

TABLE 5

| Another sending manner | |
|---|---|
| Time window | Correspondence between a transmit beam and a time sequence location |
| w1 | tx1-T1, tx2-T2, tx3-T3, and tx1-T4 |
| w2 | tx1-T2, tx2-T3, tx3-T4, and tx2-T1 |
| w3 | tx1-T3, tx2-T4, tx3-T1, and tx3-T2 |

For another sending manner, refer to Table 5. Specifically, in the time window w1, the second communications device separately sends one piece of first feedback information at the time sequence locations T1 and T4 by using tx1, sends one piece of first feedback information at the time sequence location T2 by using tx2, and sends one piece of first feedback information at the time sequence location T3 by using tx3. For a correspondence between a transmit beam and a time sequence location in another time window, refer to Table 2. It can be learned that in the sending manner in Table 2, the first feedback information is also sent on each transmit beam at each time sequence location in a traversal manner.

Table 4 and Table 5 are examples of operation 504 for description. A correspondence between a transmit beam and a time window, a quantity of time windows, and a correspondence between a transmit beam and a time sequence location are not limited in this embodiment of this application.

In addition, each piece of sent first feedback information includes an identifier of the second communications device, so that after the first communications device receives the first feedback information, the first communications device can determine that a device that completes signal synchronization and beam alignment is the second communications device. The identifier of the second communications device is used to uniquely identify the second communications device, for example, may be a hardware identification code of the communications device. A specific form of the identifier of the second communications device is not limited in this embodiment of this application.

505: The first communications device receives the first feedback information from the second communications device based on the time sequence location by using C receive beams.

506: The first communications device determines a first receive beam based on a receive beam that is in the C receive beams and on which the first feedback information is received.

For operation 505 and operation 506, refer to detailed descriptions in operation 206 and operation 207 in the embodiment shown in FIG. 2. Details are not described herein again.

507: The first communications device determines a first transmit beam based on the first feedback information.

The first feedback information includes an identifier of a synchronization signal block received by the second communications device by using the second receive beam, and one synchronization signal block in the first communications device can be sent on only one transmit beam. Therefore, the first communications device may determine, based on the identifier of the synchronization signal block that is fed back by the second communications device, a transmit beam used to send the synchronization signal block, and determine the transmit beam as the first transmit beam.

In this way, after the first communications device determines the first receive beam in operation 506, and determines the first transmit beam in operation 507, the first communications device may receive second information from the second communications device by using the first receive beam, and may further send first information to the second communications device by using the first transmit beam.

508: The first communications device sends second feedback information by using the first transmit beam.

The first communications device sends the second feedback information to the second communications device by using the first transmit beam. The second feedback information includes the identifier of the first feedback information received by the first communications device by using the first receive beam, so that the second communications device determines a second transmit beam based on the second feedback information.

Correspondingly, the second communications device receives the second feedback information. In specific implementation, the second communications device may receive the second feedback information by using the second receive beam determined in operation 503.

509: The second communications device determines the second transmit beam based on the second feedback information.

After the second communications device receives the second feedback information, the second communications device determines the second transmit beam based on the identifier of the first feedback information received by the first communications device. Because different first feedback information has different identifiers, the second communications device determines, as the second transmit beam, a transmit beam that is in the E transmit beams and on which the first feedback information received by the first communications device is sent.

In this way, after the second communications device determines the second receive beam in operation 503, and determines the second transmit beam in operation 509, the second communications device may receive second information from the first communications device by using the second receive beam, and may further send first information to the first communications device by using the second transmit beam.

The first information may be data, control information, HARQ feedback information, a reference signal, a training sequence (including but not limited to a preamble and a midamble), or other information received by the second communications device from the first communications device. The second information may be data, control information, HARQ feedback information, a reference signal, a training sequence (including but not limited to a preamble and a midamble), or other information sent by the second communications device to the first communications device. The first information and the second information are not limited in this embodiment of this application.

Based on the schematic structural diagram of the synchronization signal block shown in FIG. 3, the synchronization signal block in the embodiment shown in FIG. 5A and FIG. 5B also includes the identifier of the first communications device, the receive beam time sequence information, and the identifier of the synchronization signal block. The receive beam time sequence information is used to indicate a time sequence location at which the first communications device receives feedback information. For a manner of indicating either of the identifier and the receive beam time sequence information that are of the first communications device, refer to specific descriptions in the embodiment shown in FIG. 3. Details are not described herein again. How to indicate the identifier of the synchronization signal block by using the synchronization signal block may be indicated in a same manner. For a specific manner of indicating the identifier of the synchronization signal block, refer to detailed descriptions of indicating the receive beam time sequence information. Details are not described herein again.

In the embodiment shown in FIG. 5A and FIG. 5B, in a synchronization phase, the first communications device may determine the first receive beam and the first transmit beam that are used to perform information transmission with the second communications device, and the second communications device may also determine the second receive beam and the second transmit beam that are used to perform information transmission with the first communications device. In this way, beam alignment between the first communications device and the second communications device is completed earlier, and no additional reference signal is required to implement beam alignment, so as to reduce a waste of time-frequency resources.

Figure 6A:
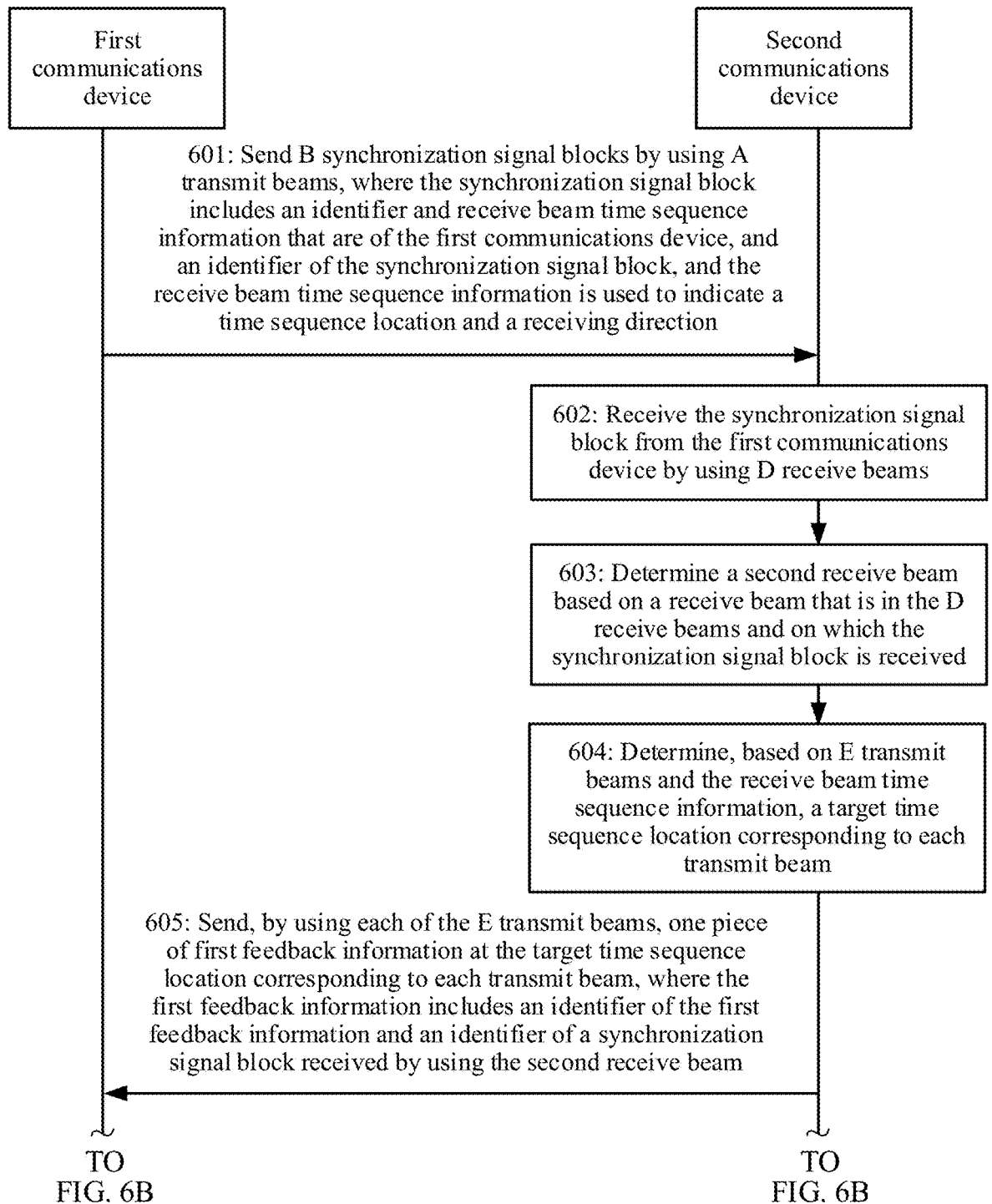
FIG. 6A and FIG. 6B are a schematic flowchart of another beam determining method according to an embodiment of this application.
Figure 6B:
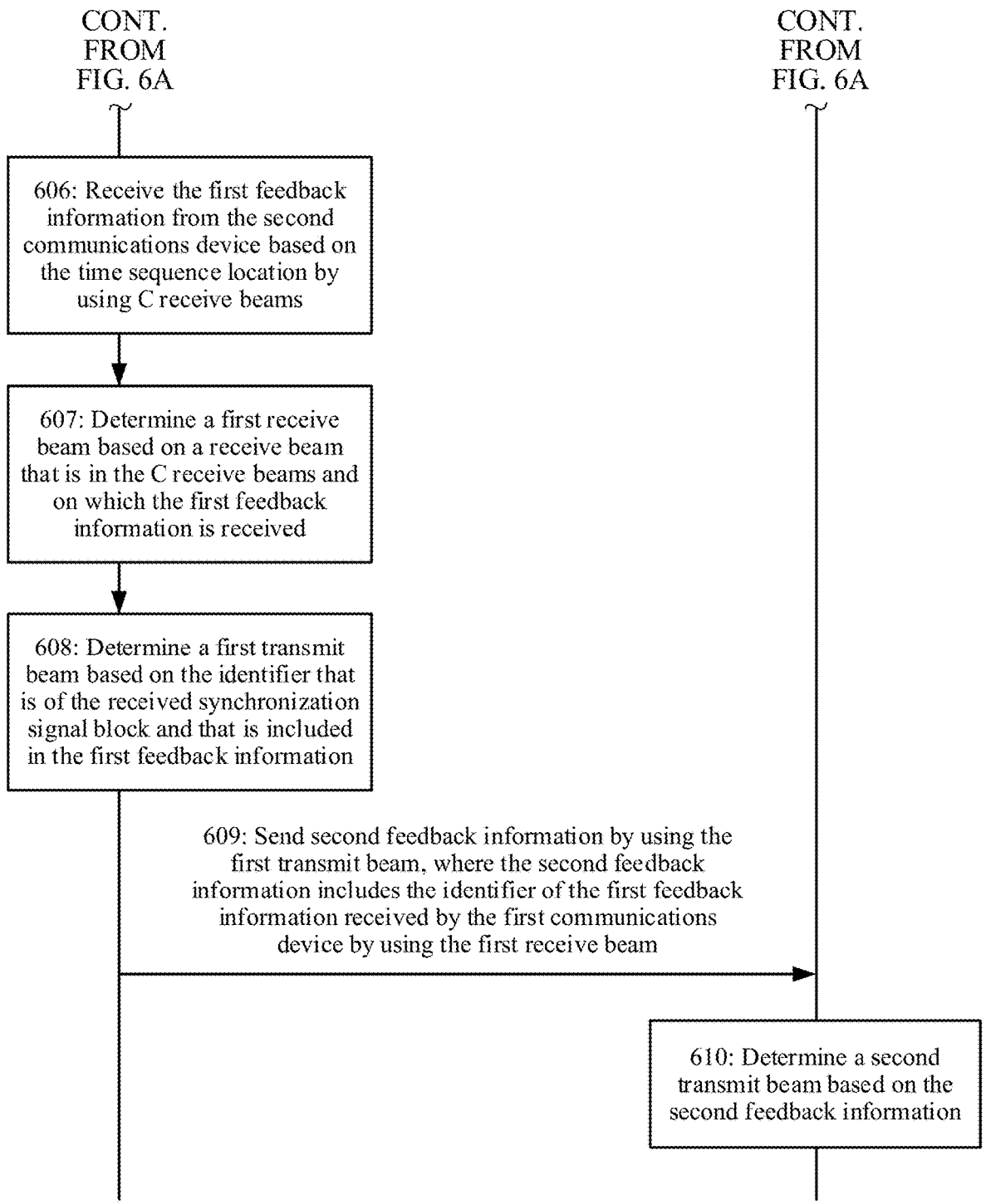

Based on the system architectural diagram shown in FIG. 1, FIG. 6A and FIG. 6B show another beam determining method according to an embodiment of this application. As shown in FIG. 6A and FIG. 6B, the beam determining method includes operation 601 to operation 610.

601: A first communications device sends B synchronization signal blocks to a second communications device by using A transmit beams.

Each of the B synchronization signal blocks sent by the first communications device includes an identifier of the first communications device, receive beam time sequence information of the first communications device, and an identifier of the synchronization signal block; the receive beam time sequence information is used to indicate a time sequence location at which the first communications device receives feedback information; and the receive beam time sequence information is further used to indicate receiving directions of C receive beams of the first communications device, an $i^{th}$ time sequence location corresponds to a receiving direction of a $j^{th}$ receive beam, the $i^{th}$ time sequence location belongs to the at least one time sequence location, and the $j^{th}$ receive beam belongs to the C receive beams. Herein, C is a positive integer, i is a positive integer, and j is a positive integer less than or equal to C. It may be understood that the time sequence location in the receive beam time sequence information is a location in a time window, and the time window may include all time sequence locations indicated by the receive beam time sequence location information. For example, the time window is a radio frame. In this way, the first communications device may receive first feedback information in a radio frame 1 based on the time sequence location by using the C receive beams, or may receive first feedback information in another radio frame 2 based on the time sequence location by using the C receive beams. A location of the time window used by the first communications device to receive the first feedback information and a quantity of time windows are not limited in this embodiment of this application.

For a correspondence between a receiving direction of a receive beam and a time sequence location in a time window, refer to detailed descriptions of Table 1 and Table 2 in the embodiment shown in FIG. 2. Details are not described herein again. In a correspondence, one time sequence location uniquely corresponds to a receiving direction of one receive beam, and a receiving direction of one receive beam uniquely corresponds to one time sequence location. Alternatively, in another correspondence, one time sequence location uniquely corresponds to a receiving direction of one receive beam, and a receiving direction of one receive beam may correspond to one or more time sequence locations.

In the embodiment shown in FIG. 6A and FIG. 6B, a $k^{th}$ synchronization signal block in the B synchronization signal blocks further includes an identifier of the $k^{th}$ synchronization signal block, where k is a positive integer less than or equal to B. In other words, one synchronization signal block corresponds to an identifier of the synchronization signal block, and identifiers of different synchronization signal blocks are different. The identifier of the synchronization signal block may alternatively be described by using a time index of the synchronization signal block. This is not limited in this embodiment of this application. The identifier of the first communications device is used to uniquely identify the first communications device, for example, may be a hardware identification code of the communications device. A specific form of the identifier of the first communications device is not limited in this embodiment of this application.

A synchronization signal block s1 and a synchronization signal block s2 may include a same identifier of the first communications device, and may include same receive beam time sequence information. An identifier of the synchronization signal block s1 is different from an identifier of the synchronization signal block s2. The synchronization signal block s1 and the synchronization signal block s2 are two different synchronization signal blocks in the B synchronization signal blocks. In this way, regardless of which synchronization signal block is received, the second communications device can uniquely determine the receive beam time sequence information of the first communications device.

The time sequence location indicated by the receive beam time sequence information may be indicated by at least one of a subframe location, a slot location, and a symbol location in a radio frame. For a specific manner of indicating the time sequence location, refer to detailed description in operation 201 in the embodiment shown in FIG. 2. Details are not described herein again.

For example, the first communications device may send the B synchronization signal blocks in a beam sweeping manner. The beam sweeping manner in the embodiments of this application specifically means that beams in different directions are formed by using a beamforming algorithm or the like, and then information is received or sent by using the beams in the different directions. The beams in the different directions may jointly cover a 360° range or jointly cover a specified angular range. In the embodiment shown in FIG. 4, the first communications device may send the B synchronization signal blocks by using transmit beams in different directions.

In the embodiment shown in FIG. 6A and FIG. 6B, for a value relationship between A and B, refer to detailed description in the embodiment shown in FIG. 5A and FIG. 5B. Details are not described herein again.

The B synchronization signal blocks may belong to a same synchronization signal burst set. For example, a synchronization signal burst set is defined in an NR communications system. Based on this communications system, the B synchronization signal blocks sent by the first communications device may belong to the same synchronization signal burst set, and the first communications device may separately send the synchronization signal blocks by using different transmit beams, to implement beam sweeping.

602: The second communications device receives the synchronization signal block from the first communications device by using D receive beams.

603: The second communications device determines a second receive beam based on a receive beam that is in the D receive beams and on which the synchronization signal block is received.

For operation 602 and operation 603, refer to detailed descriptions in operation 202 and operation 203 in the embodiment shown in FIG. 2. Details are not described herein again. A difference between the two embodiments lies in that the synchronization signal block includes different information.

604: The second communications device determines, based on E transmit beams and the receive beam time sequence information, a target time sequence location corresponding to each transmit beam.

Herein, E is s positive integer. When the receive beam time sequence information is used to indicate one time sequence location, the second communications device may determine, based on the correspondence between a receiving direction of a receive beam and a time sequence location in operation 601, that the receive beam time sequence information indicates one receiving direction that is of a receive beam and that corresponds to the time sequence location, and may determine the time sequence location as the target time sequence location corresponding to each transmit beam.

When the receive beam time sequence information is used to indicate two or more time sequence locations, based on the correspondence between a receiving direction of a receive beam and a time sequence location in operation 601, in a first case, the receive beam time sequence information indicates that a receiving direction of one receive beam corresponds to the two or more time sequence locations; or in a second case, the receive beam time sequence information indicates that receiving directions of at least two receive beams correspond to the two or more time sequence locations. The following describes the two cases.

In the first case, for example, the receive beam time sequence information of the first communications device indicates that time sequence locations are T1 and T2, and indicates that a receiving direction of a receive beam rx1 is rx1-D1. In other words, the first communications device separately receives feedback information at T1 and T2 by using the receive beam rx1. For any transmit beam tx0 in the E transmit beams, the second communications device may determine at least one of T1 and T2 as a target time sequence location corresponding to a transmit beam $tx_p$, where p is a positive integer, and $0<p\leq E$.

In the second case, for example, as shown in Table 3 in the embodiment shown in FIG. 4, the receive beam time sequence information of the first communications device indicates that time sequence locations are T1, T2, T3, T4, and T5, and indicates that a receiving direction of a receive beam rx1 is rx1-D1, a receiving direction of a receive beam rx2 is rx2-D2, and a receiving direction of a receive beam rx3 is rx3-D2. For any transmit beam tx0 in the E transmit beams, that the second communications device determines a target time sequence location based on a transmit beam $tx_p$ and the receive beam time sequence information is specifically as follows: The second communications device determines, from the receiving directions of the three receive beams, a target receiving direction based on a sending direction of the transmit beam $tx_p$ and the receiving directions rx1-D1, rx2-D2, and rx2-D2 of the three receive beams, where an included angle between the target receiving direction and the sending direction of the transmit beam $tx_p$ is smallest. If the target receiving direction is rx1-D1, the second communications device obtains the time sequence locations T1 and T2 corresponding to rx1-D1, and the second communications device may determine at least one of T1 and T2 as a target time sequence location corresponding to the transmit beam $tx_p$. If the target receiving direction is rx2-D2, the second communications device may determine the time sequence location T3 as a target time sequence location corresponding to the transmit beam $tx_p$, where p is a positive integer, and $0<p\leq E$.

605: The second communications device sends, by using each of the E transmit beams, one piece of first feedback information at the target time sequence location corresponding to the transmit beam.

The second communications device sends, by using each of the E transmit beams, the first feedback information to the first communications device at the target time sequence location corresponding to the transmit beam. In this way, the second communications device reduces a quantity of times of sending the first feedback information, to reduce a waste of time-frequency resources and improve efficiency of transmitting the first feedback information.

In the embodiment shown in FIG. 6A and FIG. 6B, it can be learned that the second communications device sends E pieces of first feedback information. Each piece of first feedback information includes an identifier of a synchronization signal block received by the second communications device by using the second receive beam and an identifier of the first feedback information. Different first feedback information has different identifiers.

In addition, each piece of sent first feedback information includes an identifier of the second communications device, so that after the first communications device receives the first feedback information, the first communications device can determine that a device that completes signal synchronization and beam alignment is the second communications device. The identifier of the second communications device is used to uniquely identify the second communications device, for example, may be a hardware identification code of the communications device. A specific form of the identifier of the second communications device is not limited in this embodiment of this application.

606: The first communications device receives the first feedback information from the second communications device based on the time sequence location by using C receive beams.

607: The first communications device determines a first receive beam based on a receive beam that is in the C receive beams and on which the first feedback information is received.

608: The first communications device determines a first transmit beam based on the first feedback information.

609: The first communications device sends second feedback information by using the first transmit beam.

610: The second communications device determines a second transmit beam based on the second feedback information.

For operation 606 to operation 610, refer to detailed descriptions in operation 505 to operation 509 in the embodiment shown in FIG. 5A and FIG. 5B. Details are not described herein again.

After the first communications device determines the first receive beam and the first transmit beam, with reference to the identifier of the second communications device that is included in the first feedback information, the first communications device may receive second information from the second communications device by using the first receive beam, and may further send first information to the second communications device by using the first transmit beam. After determining the second receive beam and the second transmit beam, with reference to the identifier of the first communications device that is included in the synchronization signal block, the second communications device may receive first information from the first communications device by using the second receive beam, and may further send second information to the first communications device by using the second transmit beam.

The first information may be data, control information, HARQ feedback information, a reference signal, a training sequence (including but not limited to a preamble and a midamble), or other information received by the second communications device from the first communications device. The second information may be data, control information, HARQ feedback information, a reference signal, a training sequence (including but not limited to a preamble and a midamble), or other information sent by the second communications device to the first communications device. The first information and the second information are not limited in this embodiment of this application.

In the embodiment shown in FIG. 6A and FIG. 6B, in a synchronization phase, the first communications device may determine the first receive beam and the first transmit beam that are used to perform information transmission with the second communications device, and the second communications device may also determine the second receive beam and the second transmit beam that are used to perform information transmission with the first communications device. In this way, beam alignment between the first communications device and the second communications device is completed earlier, and no additional reference signal is required to implement beam alignment, so as to reduce a waste of time-frequency resources. In addition, because the receive beam time sequence information further carries the receiving direction corresponding to the time sequence location, the second communications device may determine, by using the information, the target time sequence location at which the first feedback information is sent, to reduce a waste of time-frequency resources and improve efficiency of transmitting the first feedback information, so that efficiency of determining the transmit beam and the receive beam is improved.

Figure 7:
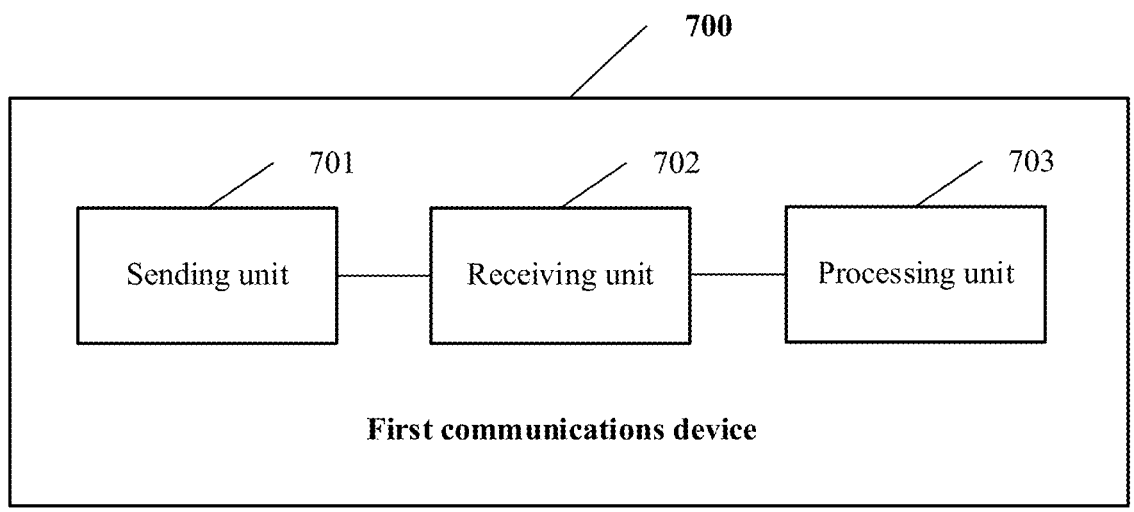
FIG. 7 is a schematic structural diagram of a communications device according to an embodiment of this application.

FIG. 7 is a schematic structural diagram of a communications device according to an embodiment of this application. The communications device may be a first communications device, and is configured to implement the embodiments shown in FIG. 2 to FIG. 6A and FIG. 6B. As shown in FIG. 7, the first communications device 700 includes a sending unit 701, a receiving unit 702, and a processing unit 703.

The sending unit 701 is configured to send B synchronization signal blocks to a second communications device by using A transmit beams, where each of the B synchronization signal blocks includes an identifier of the first communications device and receive beam time sequence information of the first communications device, the receive beam time sequence information is used to indicate a time sequence location at which the first communications device receives feedback information, and both A and B are positive integers.

The receiving unit 702 is configured to receive first feedback information from the second communications device based on the time sequence location by using C receive beams, where C is a positive integer.

The processing unit 703 is configured to determine a first receive beam based on a receive beam that is in the C receive beams and on which the first feedback information is received.

The processing unit 703 is further configured to determine a first transmit beam based on the first receive beam or the first feedback information, where the first transmit beam belongs to the A transmit beams.

The sending unit 701 is further configured to send first information to the second communications device by using the first transmit beam.

The receiving unit 702 is further configured to receive second information from the second communications device by using the first receive beam.

Optionally, the receive beam time sequence information indicates at least one time sequence location, an $i^{th}$ time sequence location corresponds to a receiving direction of a $j^{th}$ receive beam, the $i^{th}$ time sequence location belongs to the at least one time sequence location, the $j^{th}$ receive beam belongs to the C receive beams, and both i and j are positive integers.

Optionally, in the aspect of receiving the first feedback information from the second communications device based on the time sequence location by using the C receive beams, the receiving unit 702 is specifically configured to receive the first feedback information from the second communications device at the $i^{th}$ time sequence location by using the $j^{th}$ receive beam corresponding to the $i^{th}$ time sequence location.

Optionally, the receive beam time sequence information is further used to indicate a receiving direction of at least one receive beam of the first communications device, and the at least one receive beam belongs to the C receive beams.

Optionally, when the first feedback information is received on a plurality of receive beams, the first receive beam is a receive beam that is in the plurality of receive beams and that has highest received signal strength, where the plurality of beams belong to the C receive beams.

Optionally, A is a positive integer less than or equal to B.

Optionally, a $k^{th}$ synchronization signal block in the B synchronization signal blocks further includes an identifier of the $k^{th}$ synchronization signal block; the first feedback information further includes an identifier of a synchronization signal block received by the second communications device, and an $s^{th}$ transmit beam in the A transmit beams corresponds to an identifier of at least one of the B synchronization signal blocks; and the first transmit beam is determined based on the identifier of the synchronization signal block that is included in the first feedback information, and both k and s are positive integers.

Optionally, the first feedback information further includes an identifier of the first feedback information.

The sending unit 701 is further configured to send second feedback information to the second communications device by using the first transmit beam 701, where the second feedback information includes the identifier of the first feedback information received by the first communications device by using the first receive beam.

Optionally, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH.

Optionally, the first feedback information includes an identifier of the second communications device.

It may be understood that for specific implementations and corresponding beneficial effects of the function blocks included in the first communications device in FIG. 7, reference may be made to specific descriptions of the first communications device in the foregoing embodiments shown in FIG. 2 to FIG. 6A and FIG. 6B. Details are not described herein again.

In this embodiment of this application, the sending unit 701 may be a transmitter or a transmitter circuit, and the receiving unit 702 may be a receiver or a receiver circuit. The send unit 701 and the receiving unit 702 each may alternatively be a communications interface of the session management network element.

Figure 8:
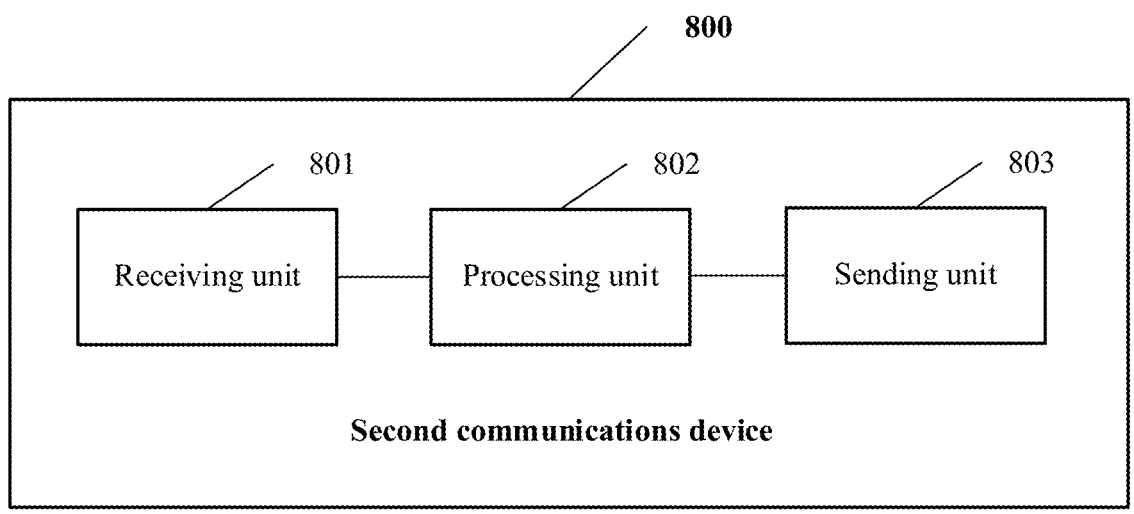
FIG. 8 is a schematic structural diagram of another communications device according to an embodiment of this application.

FIG. 8 is a schematic structural diagram of a communications device according to an embodiment of this application. The communications device may be a second communications device, and is configured to implement the embodiments shown in FIG. 2 to FIG. 6A and FIG. 6B. As shown in FIG. 8, the second communications device 800 includes a receiving unit 801, a processing unit 802, and a sending unit 803.

In a first implementation solution, the second communications device is configured to implement the embodiments shown in FIG. 2 to FIG. 4. Details are as follows:

The receiving unit 801 is configured to receive a synchronization signal block from a first communications device by using D receive beams, where the synchronization signal block includes an identifier of the first communications device and receive beam time sequence information of the first communications device, the receive beam time sequence information is used to indicate a time sequence location at which the first communications device receives feedback information, and D is a positive integer.

The processing unit 802 is configured to determine a second receive beam based on a receive beam that is in the D receive beams and on which the synchronization signal block is received.

The processing unit 802 is further configured to determine a second transmit beam based on the second receive beam.

The sending unit 803 is configured to send first feedback information to the first communications device based on the receive beam time sequence information by using the second transmit beam.

The sending unit 803 is further configured to receive first information from the first communications device by using the second receive beam.

The receiving unit 801 is further configured to send second information to the first communications device by using the second transmit beam.

Optionally, when the receive beam time sequence information indicates at least one time sequence location, in the aspect of sending the first feedback information to the first communications device based on the receive beam time sequence information by using the second transmit beam, the sending unit 803 is specifically configured to send the first feedback information to the first communications device at each of the at least one time sequence location by using the second transmit beam.

Optionally, when the receive beam time sequence information indicates at least one time sequence location, the receive beam time sequence information is further used to indicate a receiving direction of at least one receive beam of the first communications device, where an $i^{th}$ time sequence location corresponds to a receiving direction of a $j^{th}$ receive beam, the $i^{th}$ time sequence location belongs to the at least one time sequence location, the $j^{th}$ receive beam belongs to the at least one receive beam, and both i and j are positive integers.

Optionally, in the aspect of sending the first feedback information to the first communications device based on the receive beam time sequence information by using the second transmit beam, the sending unit 803 is specifically configured to send the first feedback information at a target time sequence location by using the second transmit beam, where the target time sequence location is determined from the at least one time sequence location based on the second transmit beam and the receiving direction of the at least one receive beam.

Optionally, when the synchronization signal block is received on a plurality of receive beams, the second receive beam is a receive beam that is in the plurality of receive beams and that has highest received signal strength, where the plurality of receive beams belong to the D receive beams.

Optionally, the synchronization signal block further includes an identifier of the synchronization signal block; and the first feedback information further includes an identifier of a synchronization signal block received by the second communications device by using the second receive beam.

Optionally, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH.

In a second implementation solution, the second communications device is configured to implement the embodiments shown in FIG. 5A and FIG. 5B and FIG. 6A and FIG. 6B. Details are as follows:

The receiving unit 801 is configured to receive a synchronization signal block from a first communications device by using D receive beams, where the synchronization signal block includes an identifier of the first communications device, receive beam time sequence information of the first communications device, and an identifier of the synchronization signal block, the receive beam time sequence information is used to indicate a time sequence location at which the first communications device receives feedback information, and D is a positive integer.

The processing unit 802 is configured to determine a second receive beam based on a receive beam that is in the D receive beams and on which the synchronization signal block is received.

The sending unit 803 is configured to send F pieces of first feedback information to the first communications device based on the receive beam time sequence information by using E transmit beams, where each of the F pieces of first feedback information includes an identifier of a synchronization signal block received by the second communications device by using the second receive beam and an identifier of the first feedback information, and E and F are positive integers.

The receiving unit 801 is further configured to receive second feedback information from the first communications device, where the second feedback information includes the identifier of the first feedback information received by the first communications device.

The processing unit 802 is further configured to determine a second transmit beam based on the identifier of the first feedback information received by the first communications device, where the second transmit beam is a transmit beam that is in the E transmit beams and on which the first feedback information received by the first communications device is sent.

The sending unit 803 is further configured to receive first information from the first communications device by using the second receive beam.

The receiving unit 801 is further configured to send second information to the first communications device by using the second transmit beam.

Optionally, when the receive beam time sequence information indicates at least one time sequence location, in the aspect of sending the F pieces of first feedback information to the first communications device based on the receive beam time sequence information by using the E transmit beams, the sending unit 803 is specifically configured to send one piece of first feedback information at each of the at least one time sequence location by using each of the E transmit beams.

Optionally, when the receive beam time sequence information indicates at least one time sequence location, the receive beam time sequence information is further used to indicate a receiving direction of at least one receive beam of the first communications device, where an $i^{th}$ time sequence location corresponds to a receiving direction of a $j^{th}$ receive beam, the $i^{th}$ time sequence location belongs to the at least one time sequence location, the $j^{th}$ receive beam belongs to the at least one receive beam, and both i and j are positive integers.

Optionally, in the aspect of sending the F pieces of first feedback information to the first communications device based on the receive beam time sequence information by using the E transmit beams, the sending unit 803 is specifically configured to send, by using an $m^{th}$ transmit beam, one piece of first feedback information at a target time sequence location corresponding to the $m^{th}$ transmit beam, where the $m^{th}$ transmit beam is any one of the E transmit beams, the target time sequence location corresponding to the $m^{th}$ transmit beam is determined from the at least one time sequence location based on the $m^{th}$ transmit beam and the receiving direction of the at least one receive beam, and m is a positive integer.

Optionally, when the synchronization signal block is received on a plurality of receive beams, the second receive beam is a receive beam that is in the plurality of receive beams and that has highest received signal strength, where the plurality of receive beams belong to the D receive beams.

Optionally, the synchronization signal block includes a primary synchronization signal, a secondary synchronization signal, and a physical broadcast channel PBCH; the identifier of the first communications device is indicated by the primary synchronization signal, the secondary synchronization signal, or the PBCH; and the beam time sequence information is indicated by the primary synchronization signal, the secondary synchronization signal, or the PBCH.

It may be understood that for specific implementations and corresponding beneficial effects of the function blocks included in the communications device in FIG. 8, reference may be made to specific descriptions in the foregoing embodiment shown in FIG. 4 or FIG. 5A and FIG. 5B. Details are not described herein again.

In this application of the patent, the sending unit 803 may be a transmitter or a transmitter circuit, and the receiving unit 801 may be a receiver or a receiver circuit. The send unit 803 and the receiving unit 801 each may alternatively be a communications interface of the session management network element.

Figure 9:
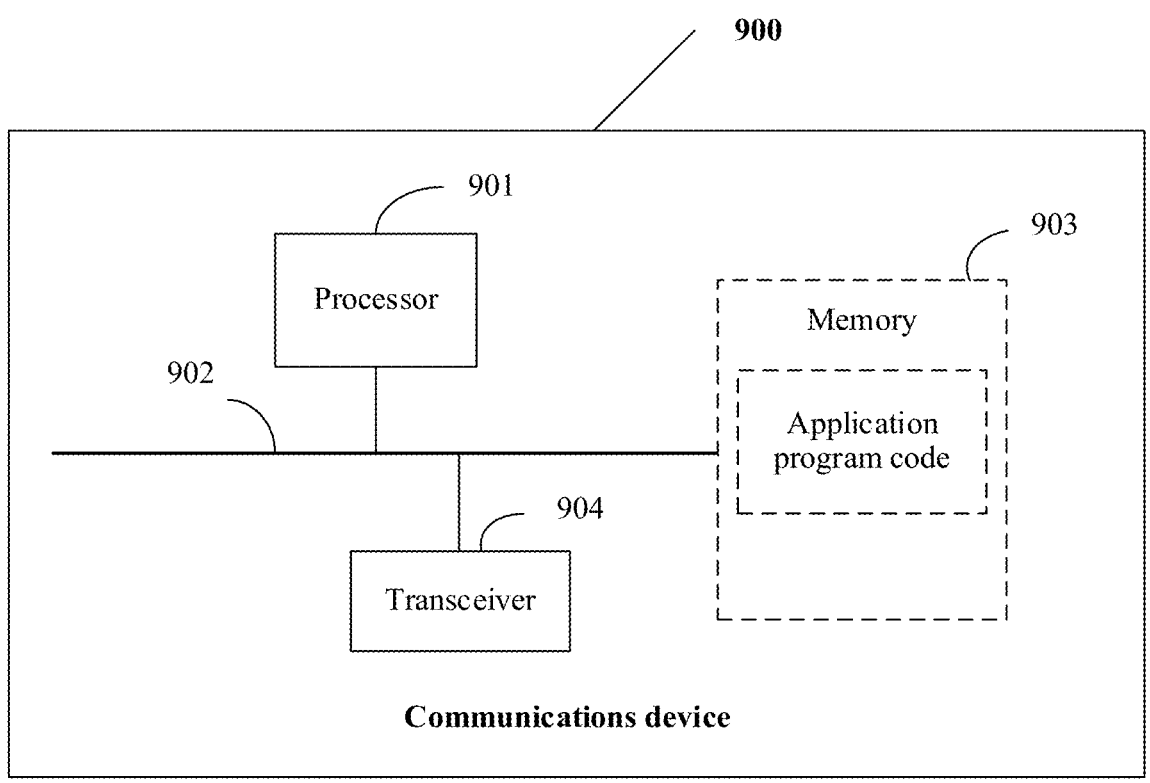
FIG. 9 is a schematic structural diagram of another communications device according to an embodiment of this application.

The communications device in the embodiments shown in FIG. 7 and FIG. 8 may be implemented by a communications device 900 shown in FIG. 9. FIG. 9 is a schematic structural diagram of another communications device according to an embodiment of this application. The communications device 900 shown in FIG. 9 includes a processor 901 and a transceiver 902. The transceiver 902 is configured to support information transmission between the communications device 900 and another communications device, for example, implement functions of the sending unit 701 and the receiving unit 702 in the embodiment shown in FIG. 7, and for another example, implement functions of the receiving unit 801 and the sending unit 803 in the embodiment shown in FIG. 8. The processor 901 and the transceiver 902 are communicatively connected, for example, are connected by using a bus. The communications device 900 may further include a memory 903. The memory 903 is configured to store program code and data that are to be executed by the communications device 900. The processor 901 is configured to execute the application program code stored in the memory 903, to implement actions of the communications device provided in any one of the embodiments shown in FIG. 2 to FIG. 6A and FIG. 6B.

It should be noted that in actual application, the communications device may include one or more processors, and a structure of the communications device 900 does not constitute a limitation on this embodiment of this application.

The processor 901 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The memory 903 may include a volatile memory, for example, a random access memory (RAM). Alternatively, the memory 903 may include a non-volatile memory, for example, a read-only memory (ROM), a flash memory, a hard disk drive (HDD), or a solid-state drive (SSD). Alternatively, the memory 903 may include a combination of the foregoing types of memories.

An embodiment of this application further provides a computer storage medium. The computer storage medium may be configured to store a computer software instruction used by the communications device in the embodiment shown in FIG. 9, and the computer software instruction includes a program designed for the communications device in the foregoing embodiment. The storage medium includes but is not limited to a flash memory, a hard disk, or a solid-state drive.

An embodiment of this application further provides a computer program product. When the computer product is run on a computing device, the computing device may perform a communication method designed for the communications device in the embodiment shown in FIG. 9.

In the specification, claims, and accompanying drawings of this application, the terms "first", "second", "third", "fourth", and the like are intended to distinguish between different objects but do not indicate a particular order. In addition, the terms "including", "having", and any other variant thereof are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

A person of ordinary skill in the art may understand that all or some of the procedures of the methods in the embodiments may be implemented by a computer program instructing related hardware. The program may be stored in a computer readable storage medium. When the program is executed, the procedures in the method embodiments may be included. The storage medium may be a magnetic disk, an optical disc, a read-only memory (ROM), a random access memory (RAM), or the like.

The foregoing disclosed descriptions are merely example embodiments of this application, and certainly is not intended to limit the protection scope of this application. Therefore, equivalent variations made in accordance with the claims of this application shall fall within the scope of this application.

What is claimed is:

1. A beam determining method, comprising:
sending, by a first communications device, B synchronization signal blocks to a second communications device by using A transmit beams, wherein each of the B synchronization signal blocks comprises an identifier of the first communications device and receive beam time sequence information of the first communications device, wherein the receive beam time sequence information is to indicate a time sequence location at which the first communications device receives feedback information, and wherein both A and B are positive integers;
receiving, by the first communications device, first feedback information from the second communications device based on the time sequence location by using C receive beams, wherein C is a positive integer;
determining, by the first communications device, a first receive beam based on a receive beam that is in the C receive beams and on which the first feedback information is received;
determining, by the first communications device, a first transmit beam from the A transmit beams based on the first receive beam or the first feedback information;
sending, by the first communications device, first information to the second communications device by using the first transmit beam;
receiving, by the first communications device, second information from the second communications device by using the first receive beam; and
sending, by the first communications device, second feedback information to the second communications device by using the first transmit beam, wherein the second feedback information comprises an identifier of the first feedback information received by the first communications device by using the first receive beam.

2. The method according to claim 1, wherein the receive beam time sequence information indicates at least one time sequence location, an $i^{th}$ time sequence location corresponds to a receiving direction of a $j^{th}$ receive beam, the $i^{th}$ time sequence location belongs to the at least one time sequence location, the $j^{th}$ receive beam belongs to the C receive beams, and both i and j are positive integers.

3. The method according to claim 2, wherein the first feedback information is received from the second communications device at the $i^{th}$ time sequence location by using the $j^{th}$ receive beam corresponding to the $i^{th}$ time sequence location.

4. The method according to claim 2, wherein the receive beam time sequence information is further to indicate a receiving direction of at least one receive beam of the C receive beams.

5. The method according to claim 1, wherein the first receive beam is a receive beam of the C receive beams that has a highest received signal strength.

6. The method according to claim 1, wherein A is less than or equal to B.

7. The method according to claim 1, wherein a $k^{th}$ synchronization signal block in the B synchronization signal blocks further comprises an identifier of the $k^{th}$ synchronization signal block;
wherein the first feedback information further comprises an identifier of a synchronization signal block of the B synchronization signal blocks received by the second communications device;
wherein an $s^{th}$ transmit beam in the A transmit beams corresponds to an identifier of at least one of the B synchronization signal blocks;
wherein the first transmit beam is determined based on an identifier of the synchronization signal block that is comprised in the first feedback information; and
wherein both k and s are positive integers.

8. The method according to claim 1, wherein each synchronization signal block of the B synchronization signal blocks comprises a primary synchronization signal, a secondary synchronization signal, and a physical broadcast channel (PBCH);
wherein the identifier of the first communications device is indicated by the primary synchronization signal, the secondary synchronization signal, or the PBCH; and
wherein the receive beam time sequence information is indicated by the primary synchronization signal, the secondary synchronization signal, or the PBCH.

9. A beam determining method, comprising:
receiving, by a second communications device, a synchronization signal block from a first communications device by using D receive beams, wherein the synchronization signal block comprises an identifier of the first communications device and receive beam time sequence information of the first communications device, wherein the receive beam time sequence information is used to indicate a time sequence location at which the first communications device receives feedback information, and wherein D is a positive integer;
determining, by the second communications device, a second receive beam based on a receive beam that is in the D receive beams and on which the synchronization signal block is received;
determining, by the second communications device, a second transmit beam based on the second receive beam;
sending, by the second communications device, first feedback information to the first communications device based on the receive beam time sequence information by using the second transmit beam;
receiving, by the second communications device, first information from the first communications device by using the second receive beam;
sending, by the second communications device, second information to the first communications device by using the second transmit beam; and
receiving, by the second communications device, second feedback information from the first communications device, where the second feedback information includes an identifier of the first feedback information received by the first communications device.

10. The method according to claim 9, wherein when the receive beam time sequence information indicates at least one time sequence location,
the sending, by the second communications device, first feedback information to the first communications device based on the receive beam time sequence information by using the second transmit beam comprises:

sending, by the second communications device, the first feedback information to the first communications device at each of the at least one time sequence location by using the second transmit beam.

11. The method according to claim 9, wherein when the receive beam time sequence information indicates at least one time sequence location, the receive beam time sequence information is further to indicate a receiving direction of at least one receive beam of the first communications device, wherein an $i^{th}$ time sequence location corresponds to a receiving direction of a $j^{th}$ receive beam, the $i^{th}$ time sequence location belongs to the at least one time sequence location, the $j^{th}$ receive beam belongs to the at least one receive beam, and both i and j are positive integers.

12. The method according to claim 11, wherein
the first feedback information is sent to the first communications device at a target time sequence location by using the second transmit beam, wherein the target time sequence location is determined from the at least one time sequence location based on the second transmit beam and the receiving direction of the at least one receive beam.

13. The method according to claim 9, wherein when the synchronization signal block is received on a plurality of receive beams, the second receive beam is a receive beam that is in the plurality of receive beams and that has a highest received signal strength, wherein the plurality of receive beams belong to the D receive beams.

14. The method according to claim 9, wherein the synchronization signal block further comprises an identifier of the synchronization signal block, and wherein the first feedback information further comprises an identifier of a synchronization signal block received by the second communications device by using the second receive beam.

15. The method according to claim 9, wherein the synchronization signal block comprises a primary synchronization signal, a secondary synchronization signal, and a physical broadcast channel (PBCH);
wherein the identifier of the first communications device is indicated by the primary synchronization signal, the secondary synchronization signal, or the PBCH; and
wherein the receive beam time sequence information is indicated by the primary synchronization signal, the secondary synchronization signal, or the PBCH.

16. A communications device, wherein the communications device is a first communications device, and the first communications device comprises:
a processor;
a memory connected to the processor, the memory storing program instructions, which, when executed by the processor, cause the processor to perform operations comprising:
sending send B synchronization signal blocks to a second communications device by using A transmit beams, wherein each of the B synchronization signal blocks comprises an identifier of the first communications device and receive beam time sequence information of the first communications device, wherein the receive beam time sequence information is to indicate a time sequence location at which the first communications device receives feedback information, and wherein both A and B are positive integers;
receiving first feedback information from the second communications device based on the time sequence location by using C receive beams, wherein C is a positive integer;
determining a first receive beam based on a receive beam that is in the C receive beams and on which the first feedback information is received;
determining a first transmit beam from the A transmit beams based on the first receive beam or the first feedback information;
sending first information to the second communications device by using the first transmit beam; and
receiving second information from the second communications device by using the first receive beam, and
sending second feedback information to the second communications device by using the first transmit beam, wherein the second feedback information comprises an identifier of the first feedback information received by the first communications device by using the first receive beam.

17. The communications device according to claim 16, wherein the receive beam time sequence information indicates at least one time sequence location, an $i^{th}$ time sequence location corresponds to a receiving direction of a $j^{th}$ receive beam, the $i^{th}$ time sequence location belongs to the at least one time sequence location, the $j^{th}$ receive beam belongs to the C receive beams, and both i and j are positive integers.

18. The communications device according to claim 17, the operations further comprising: receiving the first feedback information from the second communications device at the $i^{th}$ time sequence location by using the $j^{th}$ receive beam corresponding to the i time sequence location.

19. The communications device according to claim 17, wherein the receive beam time sequence information is further to indicate a receiving direction of at least one receive beam of the first communications device, and wherein the at least one receive beam belongs to the C receive beams.

* * * * *